United States Patent
Zhang et al.

(10) Patent No.: US 10,026,206 B2
(45) Date of Patent: Jul. 17, 2018

(54) IMAGE EDITING TECHNIQUES FOR A DEVICE

(71) Applicant: QUALCOMM Incorporated, San Diego, CA (US)

(72) Inventors: Lei Zhang, Beijing (CN); Ning Bi, San Diego, CA (US); Fan Ling, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 15/111,175

(22) PCT Filed: Feb. 24, 2014

(86) PCT No.: PCT/CN2014/000172
§ 371 (c)(1),
(2) Date: Jul. 12, 2016

(87) PCT Pub. No.: WO2015/123792
PCT Pub. Date: Aug. 27, 2015

(65) Prior Publication Data
US 2016/0335789 A1    Nov. 17, 2016

Related U.S. Application Data

(60) Provisional application No. 61/941,996, filed on Feb. 19, 2014.

(51) Int. Cl.
*G06K 9/00* (2006.01)
*G06T 11/60* (2006.01)
(Continued)

(52) U.S. Cl.
CPC ............ *G06T 11/60* (2013.01); *G06F 3/0488* (2013.01); *G06K 9/2081* (2013.01); *G06K 9/342* (2013.01);
(Continued)

(58) Field of Classification Search
CPC . G06T 11/60; G06T 7/194; G06T 7/11; G06T 2207/10004; G06K 9/342; G06K 9/2081; G06F 3/0488
(Continued)

(56) References Cited

U.S. PATENT DOCUMENTS 6,973,212 B2    12/2005  Boykov et al.
7,593,020 B2    9/2009   Zitnick et al.
(Continued)

FOREIGN PATENT DOCUMENTS

CN    101390090 A    3/2009
CN    101976194 A    2/2011
(Continued)

OTHER PUBLICATIONS

International Search Report and Written Opinion—PCT/CN2014/000172—ISA/EPO—dated Nov. 21, 2014, 14 pages.
(Continued)

*Primary Examiner* — Aaron W Carter
(74) *Attorney, Agent, or Firm* — Toler Law Group, P.C.

(57) ABSTRACT

A method of manipulating an image by a mobile-device includes segmenting image data corresponding to the image into a first image layer and a second image layer. The method also includes receiving a first user input at the mobile device, the first user input indicating a direction relative to the mobile device, and performing a first image editing operation on the first image layer based on the first user input. The method further includes receiving a second user input at the mobile device, the second user input indicating the direction relative to the mobile device, and performing a second image editing operation on the first image layer based on the second user input. The second image editing operation is distinct from the first image editing operation.

30 Claims, 12 Drawing Sheets

(51) Int. Cl.
*G06F 3/0488* (2013.01)
*G06K 9/20* (2006.01)
*G06K 9/34* (2006.01)
*G06T 7/11* (2017.01)
*G06T 7/194* (2017.01)

(52) U.S. Cl.
CPC ............... *G06T 7/11* (2017.01); *G06T 7/194* (2017.01); *G06T 2207/10004* (2013.01)

(58) Field of Classification Search
USPC .......... 382/180, 181, 309, 118, 263; 700/28, 700/286, 191
See application file for complete search history.

(56) References Cited

U.S. PATENT DOCUMENTS

| | | | |
|---|---|---|---|
| 8,238,660 | B2 | 8/2012 | Lin et al. |
| 8,644,600 | B2 | 2/2014 | Yang et al. |
| 8,873,813 | B2* | 10/2014 | Tadayon .................. G06K 9/00 382/118 |
| 9,697,820 | B2* | 7/2017 | Jeon ........................ G10L 13/07 |
| 9,965,865 | B1* | 5/2018 | Agrawal ................. G06T 7/194 |
| 2004/0008886 | A1 | 1/2004 | Boykov |
| 2007/0147700 | A1 | 6/2007 | Jeong et al. |
| 2009/0096808 | A1* | 4/2009 | Winn ...................... G06T 11/60 345/594 |
| 2009/0252429 | A1 | 10/2009 | Prochazka et al. |
| 2009/0256947 | A1 | 10/2009 | Ciurea et al. |
| 2012/0148151 | A1 | 6/2012 | Hamada et al. |
| 2012/0190388 | A1* | 7/2012 | Castleman .............. H04L 51/04 455/466 |
| 2012/0210229 | A1* | 8/2012 | Bryant ..................... H04N 9/73 715/723 |
| 2012/0327172 | A1* | 12/2012 | El-Saban ........... G06K 9/00228 348/14.02 |
| 2013/0088614 | A1 | 4/2013 | Lee |
| 2013/0236093 | A1 | 9/2013 | Gatt et al. |
| 2013/0272625 | A1 | 10/2013 | Cheng |
| 2013/0346898 | A1 | 12/2013 | Kokemohr |
| 2014/0029868 | A1 | 1/2014 | Lorenz et al. |
| 2014/0211993 | A1 | 7/2014 | Ishii |
| 2015/0286283 | A1* | 10/2015 | Cheng ..................... G06F 3/017 345/173 |

FOREIGN PATENT DOCUMENTS

| | | |
|---|---|---|
| CN | 102592268 A | 7/2012 |
| CN | 103152521 A | 6/2013 |
| CN | 103294362 A | 9/2013 |
| EP | 1826723 A1 | 8/2007 |
| JP | 2004246460 A | 9/2004 |
| JP | 2009037282 A | 2/2009 |
| JP | 2009278623 A | 11/2009 |
| JP | 2010533918 A | 10/2010 |
| WO | 2013145589 A1 | 10/2013 |

OTHER PUBLICATIONS

Achanta R., et al., "SLIC Superpixels", School of Computer and Communication Sciences, EPFL, Jun. 2010, 15 Pages.

Barrett W.A., et al., "Object-Based Image Editing", Computer Graphics Proceedings, Proceedings of Siggraph Annual International Conference on Computer Graphics and Interactive Techniques, Jan. 1, 2002 (Jan. 1, 2002), XP002338402, pp. 777-784.

Kim G., et al., "Distributed Cosegmentation via Submodular Optimization on Anisotropic Diffusion", IEEE International Conference on Computer Vision (ICCV), 2011, 8 Pages.

Rother C., et al., ""GrabCut"—Interactive Foreground Extraction using Iterated Graph Cuts," Proceedings of SIGGRAPH, Aug. 2004, pp. 309-314.

Supplementary European Search Report—EP14882881—Search Authority—Munich—dated Dec. 14, 2017.

Tani T., et al., "Improvement of Perceptual Segmentation Algorithm for Color Images Using Fuzzy-Based Split-and-Merge Method", The Institute of Electronics, Information and Communication Engineers, IEICE Technical Report, IT2013-41, IE2013-106 (Feb. 2014), Feb. 10, 2014, vol. 38, No. 7, Japan, pp. 67-72, ISSN 1342-6893, Abstract Only.

* cited by examiner

IMAGE EDITING TECHNIQUES FOR A DEVICE

I. FIELD

The present disclosure is generally related to image editing for a device.

II. DESCRIPTION OF RELATED ART

Advances in technology have resulted in smaller and more powerful electronic devices. For example, there currently exist a variety of mobile devices, such as wireless telephones, personal digital assistants (PDAs), and paging devices. A wireless device may be small, lightweight, and easily carried by users. Wireless telephones, such as cellular telephones and Internet Protocol (IP) telephones, can communicate voice and data packets over wireless networks. Also, wireless telephones can process executable instructions, including software applications, such as a web browser application, that can be used to access the Internet. Further, many wireless telephones include other types of devices that are incorporated therein. For example, a wireless telephone can also include a digital still camera, a digital video camera, a digital recorder, and an audio file player. As such, wireless telephones and other mobile devices can include significant computing capabilities.

A mobile device may include a camera and an image editing application usable to alter (or "edit") images captured with the camera. A user of the mobile device may capture an image using the camera and then alter the image using the image editing application, such as prior to sharing the image with friends or family. Certain image editing applications may enable a user perform computationally simple operations, such as removing (or "cropping") a portion of an image. More advanced image editing applications may enable a user to perform more computationally intensive operations on a mobile device, but these operations may still not provide the user sufficient control over image editing operations to achieve certain image editing effects, potentially frustrating the user of the mobile device. Advanced image editing applications may also utilize complicated user input techniques that users may find difficult or cumbersome to use.

III. SUMMARY

A processor may receive image data corresponding to an image. To illustrate, a mobile device may include the processor and a camera, and the camera may capture the image. The processor may segment the image data (e.g., using a segmentation technique) into a first image layer and a second image layer. The first image layer may correspond to a foreground of the image and the second image layer may correspond to a background of the image, as illustrative examples. Alternatively, the first image layer and the second image layer may each correspond to foreground portions of the image (or background portions of the image).

The first image layer and the second image layer may be independently edited by a user to create one or more visual effects. To illustrate, a user may perform an image editing operation on the first image layer but not the second image layer (or vice versa). The user may utilize an image editing application to perform the image editing operation, which may be executed by the processor. The image editing operation may include changing a color attribute of the first image layer but not the second image layer (e.g., changing a color of an object independently of a color of another object). As another example, the image editing operation may include blurring the first image layer but not the second image layer, such as by "blurring" the background but not the foreground to approximate a "super focus" camera effect of a camera that uses a large aperture to capture an image in which a foreground is in focus and in which the foreground is sharper than a background. A user may therefore experience greater control of visual effects of an image as compared to conventional systems in which an entire image (e.g., all image layers of an image) is edited based on a particular image editing operation.

In a particular embodiment, identification of the clusters is initiated automatically in response to user input selecting the image. For example, identification of the clusters may be initiated automatically in response to user selection of the image via a user interface (UI) (e.g., selection of the image from an image gallery). Automatically identifying the clusters may "hide" a time lag associated with identification of the clusters. For example, by automatically identifying the clusters in response to selection of the image via the UI, the time lag associated with identification of the clusters may be "hidden" during loading of the image. That is, a user may perceive that the time lag is associated with loading of the image instead of with initiation of a particular image editing operation that is initiated after loading the image. In this example, when the user initiates the image editing operation, cluster identification may already be complete, which may cause the image editing operation to appear faster to the user.

The processor may initiate one or more image processing operations automatically in response to user input related to the first image layer. To illustrate, for an image that includes multiple image layers (e.g., multiple foreground objects and/or multiple background objects), processing of each individual image layer may be associated with a time lag. To reduce time lag associated with image segmentation, the processor may initiate one or more image processing operations associated with the first image layer (e.g., an image segmenting operation and/or an image labeling operation) using one or more identified clusters prior to receiving user input related to each of the multiple image layers. In this example, image processing of a foreground portion of an image may be initiated prior to receiving user input related to a background of the image. Accordingly, image editing performance of the processor may be improved as compared to a device that waits to initiate image processing operations until user input is received for each image layer.

Alternatively or in addition, a mobile device may store user configuration parameters that determine image editing operations that may be performed at the mobile device in response to user input. To illustrate, the mobile device may include a display (e.g., a touchscreen). The display may depict an image, such as in connection with an image editing application executed by the mobile device. The image editing application may perform image editing operations on the image in response to user input. For example, the user configuration parameters may indicate that the mobile device is to perform a particular image editing operation (e.g., a color change operation) in response to receiving first user input indicating a particular direction of movement, such as a "swipe" across the touchscreen in a vertical (or substantially vertical) direction. The user configuration parameters may further indicate that the mobile device is to perform a second image editing operation in response to second user input indicating the particular direction received after the first user input (e.g., a subsequent vertical swipe operation). For example, the user configuration parameters may indicate that an image blurring operation is to be performed in response to the second user input.

The user configuration parameters may be configurable by a user. For example, the user configuration parameters may be modified by a user to indicate that the second image editing operation is to be performed prior to the first image editing operation (e.g., in response to the first user input). In a particular embodiment, third user input received after the first user input and after the second user input may "undo" the first image editing operation and the second image editing operation. Accordingly, image editing is simplified for a user of the mobile device. Further, image editing operations may be configurable using the user configuration parameters.

In a particular embodiment, a method of manipulating an image by a device is disclosed. The method includes segmenting image data corresponding to the image into a first image layer and a second image layer. The method further includes adjusting a first attribute of the first image layer independently of a second attribute of the second image layer based on user input.

In another particular embodiment, an apparatus includes a memory and a processor coupled to the memory. The processor is configured to segment image data corresponding to an image into a first image layer and a second image layer. The processor is further configured to adjust a first attribute of the first image layer independently of a second attribute of the second image layer based on user input.

In another particular embodiment, a non-transitory computer-readable medium stores instructions. The instructions are executable by a processor to cause the processor to segment image data associated with an image into a first image layer and a second image layer. The instructions are further executable by the processor to adjust a first attribute of the first image layer independently of a second attribute of the second image layer based on user input.

In another particular embodiment, an apparatus includes means for segmenting image data associated with an image into a first image layer and a second image layer. The apparatus further includes means for adjusting a first attribute of the first image layer independently of a second attribute of the second image layer based on user input.

In another particular embodiment, a method includes displaying a first image at a mobile device. The method further includes receiving first user input at the mobile device. The first user input indicates a direction relative to the mobile device. Based on the first user input, a first image editing operation is performed on the first image to generate a second image. The method further includes displaying the second image at the mobile device and receiving second user input at the mobile device. The second user input indicates the direction. The method further includes performing a second image editing operation on the second image to generate a third image based on the second user input.

In another particular embodiment, an apparatus includes a memory and a processor coupled to the memory. The processor is configured to cause a mobile device to display a first image and to receive first user input at the mobile device. The first user input indicates a direction relative to the mobile device. The processor is further configured to perform a first image editing operation on the first image to generate a second image based on the first user input, to cause the mobile device to display the second image, and to receive second user input. The second user input indicates the direction. The processor is further configured to perform a second image editing operation on the second image to generate a third image based on the second user input.

In another particular embodiment, a computer-readable medium stores instructions that are executable by a processor to cause a mobile device to display a first image at the mobile device and to receive first user input at the mobile device. The first user input indicates a direction relative to the mobile device. The instructions are further executable by the processor to perform, based on the first user input, a first image editing operation on the first image to generate a second image, to display the second image at the mobile device, and to receive second user input at the mobile device. The second user input indicates the direction. The instructions are further executable by the processor to perform, based on the second user input, a second image editing operation on the second image to generate a third image.

In another particular embodiment, an apparatus includes means for displaying a first image at a mobile device and means for receiving first user input at the mobile device. The first user input indicates a direction relative to the mobile device. The apparatus further includes means for performing a first image editing operation on the first image to generate a second image based on the first user input, means for causing cause the mobile device to display the second image, and means for receiving second user input. The second user input indicates the direction. The apparatus further includes means for performing a second image editing operation on the second image to generate a third image based on the second user input.

In another particular embodiment, a method includes receiving first user input from a user interface. The first user input selects an image for a display operation. The method further includes performing the display operation based on the first user input and automatically initiating a clustering operation using image data corresponding to the image based on the first user input.

In another particular embodiment, an apparatus includes a memory and a processor coupled to the memory. The processor is configured to receive first user input from a user interface. The first user input selects an image for a display operation. The processor is further configured to perform the display operation based on the first user input and to automatically initiate a clustering operation using image data corresponding to the image based on the first user input.

In another particular embodiment, a computer-readable medium stores instructions that are executable by a processor to cause the processor to receive first user input from a user interface. The first user input selects an image for a display operation. The instructions are further executable by the processor to perform the display operation based on the first user input and to automatically initiate a clustering operation using image data corresponding to the image based on the first user input.

In another particular embodiment, an apparatus includes means for receiving first user input from a user interface. The first user input selects an image for a display operation. The apparatus further includes means for performing the display operation based on the first user input and means for automatically initiating a clustering operation using image data corresponding to the image based on the first user input.

One particular advantage provided by at least one of the disclosed embodiments is independent image editing of a first image layer and a second image layer of an image. A user may therefore be enabled to "fine tune" image editing operations as compared to conventional systems in which an entire image (e.g., all image layers of an image) are edited based on a particular image editing operation. Another particular advantage provided by at least one of the disclosed embodiments is simplified control of a user interface (UI) by a user of a mobile device. For example, the UI may enable the user to set user configuration parameters that assign certain image editing operations to a particular user input (e.g., a swipe in a particular direction), which simplifies user control of an image editing application executed by the mobile device. Another particular advantage of at least one of the disclosed embodiments is a faster image editing experience as perceived by a user of a device. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
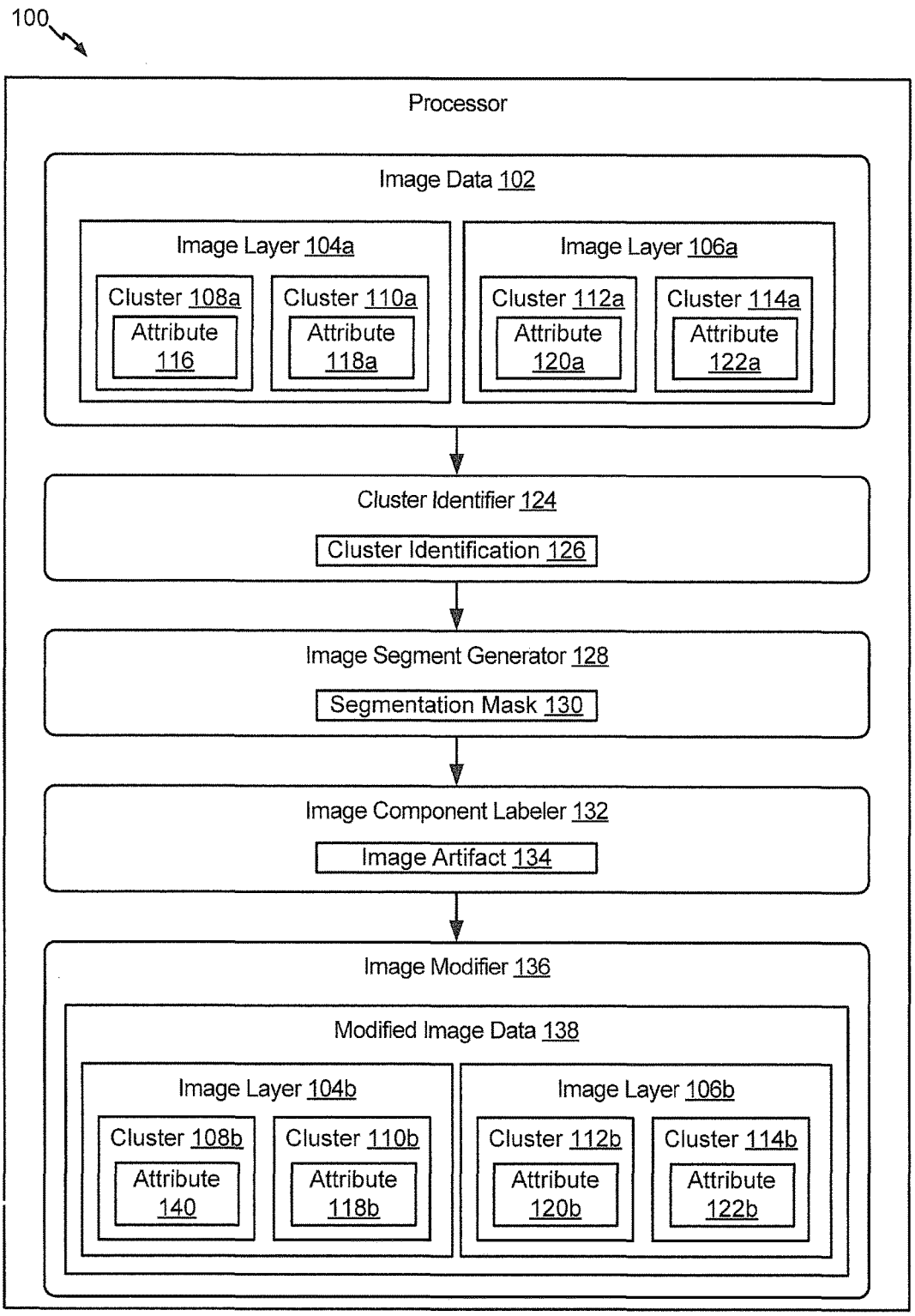
FIG. 1 is block diagram of a particular illustrative embodiment of a processor.

Referring to FIG. 1, a particular illustrative embodiment of a processor is depicted and generally designated 100. The processor 100 includes a cluster identifier 124, an image segment generator 128, an image component labeler 132, and an image modifier 136.

In operation, the processor 100 may be responsive to image data 102. For example, the image data 102 may be received from a camera or from a camera controller associated with the camera. The image data 102 may include one or more image layers, such as an image layer 104a and an image layer 106a. The image layers 104a, 106a may correspond to a foreground portion of an image and a background portion of the image, respectively. Alternatively, the image layers 104a, 106a may each correspond to a foreground portion or may each correspond to a background portion.

The image data 102 may further include one or more clusters of pixels (e.g., a pixel cluster corresponding to an object depicted in the image). For example, FIG. 1 illustrates that the image layer 104a may include a cluster 108a and a cluster 110a. As another example, FIG. 1 further illustrates that the image layer 106a may include a cluster 112a and a cluster 114a. The clusters 108a, 110a, 112a, and 114a may include one or more attributes, such as an attribute 116, an attribute 118a, an attribute 120a, and/or an attribute 122a. The attributes 116, 118a, 120a, and/or 122a may correspond to visual aspects of an image, such as a color, a sharpness, a contrast, a context of the image (e.g., a setting, such as a background setting), a blurring effect and/or another aspect, as illustrative examples.

The cluster identifier 124 may be responsive to the image data 102 to identify one or more clusters of the image using one or more cluster identification techniques. For example, the cluster identifier 124 may identify one or more clusters of the image data 102, such as one or more of the clusters 108a, 110a, 112a, or 114a. The cluster identifier 124 may analyze the image data 102 to generate a cluster identification 126. The cluster identification 126 may identify one or more of the clusters 108a, 110a, 112a, or 114a. A cluster may correspond to a group of similar pixels of the image data 102. To illustrate, pixels may be similar if the pixels are spatially similar (e.g., within a common threshold area) and/or if the pixels are numerically similar (e.g., within a pixel value threshold range). The cluster identifier 124 may perform one or more operations to compare pixels of the image data 102 to identify one or more groups of similar pixels to generate the cluster identification 126.

The cluster identifier 124 may be configured to generate the cluster identification 126 using a "superpixel" technique that identifies one or more superpixels of the image data 102. The one or more superpixels may correspond to the clusters 108a, 110a, 112a, and 114a. In a particular example, the cluster identifier 124 is configured to operate in accordance with a simple linear iterative clustering (SLIC) technique. The SLIC technique may divide the image data into a "grid" and may compare pixels of the image data 102 within each component of the grid to identify clusters of the image data 102. The SLIC technique may be performed in connection with a color space model that maps colors to a multi-dimensional model, such as an International Commission on Illumination L*, a*, and b* (CIELAB) color space model.

The SLIC technique may identify K superpixel centers $C\_k$ for $k=1, 2, \ldots K$, where $C\_k=[l\_k, a\_k, b\_k, x\_k, y\_k]T$ at grid intervals each having a grid interval size S, where K is a positive integer number, where T indicates the transpose operation, and where l, a, b, x, and y may indicate parameters associated with a CIELAB color space model. In a particular embodiment, a spatial extent of any superpixel is approximately 2S. Accordingly, pixels included in a particular superpixel may lie within a 2S×2S area around the center of the superpixel (relative to the x-y plane). The 2S×2S area may correspond to a "search area" for the pixels similar to each superpixel center.

In a CIELAB color space model, certain Euclidean distances (e.g., a distance between points indicating colors in the multi-dimensional model) may be perceivable by a user when implemented at a display, potentially causing poor visual appearance or another effect. If spatial pixel distances exceed such a perceptual color distance threshold, the spatial pixel distances may outweigh pixel color similarities, causing image distortion (e.g., resulting in superpixels that do not respect region boundaries, only proximity in the image plane). Therefore, instead of using a simple Euclidean norm in five-dimensional (5D) space, a distance measure $D\_s$ may be defined such that $D\_s=d\_lab+(m/S)d\_xy$, where $d\_lab=\sqrt{(l\_k-l\_i)^2+(a\_k-a\_i)^2+(b\_k-b\_i)^2}$, $d\_xy = \text{sqrt}[(x\_k-x\_y)^2+(x\_k-x\_y)^2]$, m indicates a variable enabling control of compactness of a superpixel, and S indicates the grid interval size S. In this example, D_s corresponds to a sum of the lab distance (d_lab) and the x-y plane distance (d_xy) normalized by the grid interval size S and having a "compactness" determined by the variable m. To further illustrate, Table 1 illustrates example pseudo-code corresponding to an example operation of the cluster identifier 124.

TABLE 1

1: Initialize cluster centers C_k = [l_k, a_k, b_k, x_k, y_k]T by sampling pixels at regular grid steps S.
2: Perturb cluster centers in an n×n neighborhood, to the lowest gradient position.
3: repeat
4:   for each cluster center C_k do
5:     Assign the best matching pixels from a 2S×2S square neighborhood around the cluster center according to the distance measure D_S
6:   end for
7:   Compute new cluster centers and residual error E {L1 distance between previous centers and recomputed center}
8: until E ≤ threshold
9: Enforce connectivity.

The image segment generator 128 may be responsive to the cluster identifier 124 to segment the image using one or more segmentation techniques. For example, the image segment generator 128 may generate a segmentation mask 130 based on the cluster identification 126. In a particular example, the segmentation mask 130 identifies one or more foreground or background layers of the image data 102, such as by separating the image layer 104a from the image layer 106a based on the cluster identification 126. The image segment generator 128 may generate the segmentation mask 130 by isolating one or more clusters identified by the cluster identifier 124 from a remainder of the image data 102. For example, the image segment generator 128 may segment (e.g., remove, partition, etc.) one or more groups of pixels indicated by the cluster identification 126 from the image data 102 to generate the segmentation mask 130.

In a particular embodiment, the image segment generator 128 is responsive to a set of superpixels z_n generated by the cluster identifier 124. The superpixels may be represented using the CIELAB color space model. The image segment generator 128 may apply a "grabcut" technique to the set of superpixels. The image segment generator 128 may utilize the grabcut technique to generate a Gaussian mixture model (GMM). In a particular embodiment, the image segment generator 128 is configured to generate a first GMM having a first set of Gaussian distributions corresponding to superpixels of a foreground of an image and is further configured to generate a second GMM having a second set of Gaussian distributions corresponding to superpixels of a background of the image. Each GMM may correspond to a full-covariance Gaussian mixture with a positive integer number of K components (e.g., K=5). To improve tractability of image processing operations, a vector k={k_1, k_n, k_N} may be used in connection with the GMMs, with $k\_n \in \{1, \ldots K\}$. A corresponding GMM component (e.g., α_n) may be assigned to each pixel. The GMM component may be selected from either the background GMM or the foreground GMM (e.g., according to α_n=0 or α_n=1).

Operation of the image segment generator 128 may be associated with an energy consumption, such as a Gibbs energy corresponding to $E(\alpha,k,\theta,z)=U(\alpha,k,\theta,z)+V(\alpha,z)$, where k may indicate a GMM variable, U may indicate a data term, $U(\alpha,k,\theta,z)=\Sigma_n D_n(\alpha_n,k_n,\theta,z_n)$, $D_n(\alpha_n,k_n,\theta,z_n)=-\log p(z_n|\alpha_n,k_n,\theta)-\log \pi(\alpha_n,k_n)$, $D_n$ may indicate a Gaussian probability distribution, and p(•) may indicate mixture weighting coefficients, so that (up to a constant): $D_n(\alpha_n,k_n,\theta,z_n)=-\log \pi(\alpha_n,k_n)+\frac{1}{2}\log \det\Sigma(\alpha_n,k_n)+\frac{1}{2}[z_n-\mu(\alpha_n,k_n)]^T \Sigma(\alpha_n,k_n)^{-1}[z_n-\mu(\alpha_n,k_n)]$. Therefore, the parameters of the model may correspond to $\theta=\{\pi(\alpha,k),\mu(\alpha,k),\Sigma(\alpha,k),\alpha=0, 1, k=1 \ldots K\}$ (i.e., the weights π, means μ, and covariances Σ of the 2K Gaussian components for the background and foreground distributions). In a particular example, the smoothness term V is unchanged relative to a monochrome example except that the contrast term is computed using Euclidean distance in color space according to: $V(\alpha,z)=\gamma\Sigma_{(m,n)\in C}[\alpha_m \neq \alpha_n]\exp(-\beta\|z_m-z_n\|^2)$. To further illustrate, Table 2 illustrates example pseudo-code corresponding to an example operation of the processor 100.

TABLE 2

Initialization

The superpixels on foreground are set to $T_F$; The superpixels on background are set to $T_B$. Rest of the superpixels are set to $T_U = 1 - T_F - T_B$.
Generate connectivity network on superpixel
Initialize $\alpha_n = 0$ for n ∈ $T_B$ and $\alpha_n = 1$ for n ∈ $T_F$.
Calculate weight between each pair of superpixels Iterative minimization 1. Background and foreground GMMs initialized using means from sets $\alpha_n = 0$ and $\alpha_n = 1$ respectively (e.g., according to background and/or foreground user input).
2. Assign GMM components to pixels: for each n in $T_U$, where $$k_n := \underset{k_n}{\arg\min} D_n(a_n, k_n, \theta, z_n)$$

3. Estimate segmentation: use min cut to solve:

$$\min_{(a_n 1 n \in T_U)} \left( \min_k E(a, k, \theta, z) \right)$$

4. Do component labeling on the result mask (e.g., perform image component labeling on the segmentation mask 130 by the image component labeler 132)

User editing

Refine operation: receive additional user input (e.g., user swipe actions) and perform entire iterative minimization algorithm (e.g., repeat 1, 2, 3, and/or 4)

The image component labeler 132 may be responsive to the image segment generator 128. For example, the image component labeler 132 may analyze the segmentation mask 130 for one or more image artifacts, such as an image artifact 134. The image artifact 134 may correspond to a portion of the image that is "unintentionally" separated from another portion of the image. For example, a portion of the image may be "misidentified" as being in the foreground or background of the image, and the image artifact 134 may correspond to the "misidentified" portion. In a particular embodiment, the image component labeler 132 may be responsive to user input to identify the image artifact 134.

In a particular embodiment, the image component labeler 132 is configured to compensate for operation of the image segment generator 128. To illustrate, the segmentation mask 130 may have one or more "holes" due to color-based operation of the image segment generator 128 (e.g., image artifacts, such as the image artifact 134). Further, one or more objects or layers may be "mislabeled" due to color similarity. For example, different colors of a common object may be mislabeled as foreground and background, and/or similar colors of different objects may be mislabeled as foreground or background. The image component labeler 132 may be configured to operate on a foreground region as an object, and the object may be operated on as a domain, such as a "simple-connectivity domain." To further illustrate, Table 3 illustrates example pseudo-code corresponding to an example operation of the image component labeler 132.

TABLE 3

```
1:  repeat
2:    for each foreground superpixel do
3:      Take this superpixel as a seed to label the corresponding
         region
4:      Find the contour of this region
5:      Fulfill this region by FloodFill
6:    end for
7:  until all superpixels are processed
8:  Check the superpixel that is on foreground/background stroke
```

The image modifier 136 may be responsive the image component labeler 132. The image modifier 136 may be further responsive to user input, such as via a user interface (UI) of a device that includes the processor 100, to adjust a first attribute of a first layer of the image data 102 independently of a second attribute of a second layer of the image data 102. To illustrate, the example of FIG. 1 illustrates that the image modifier 136 may generate modified image data 138 corresponding to the image data 102. The modified image data 138 may depict independent modification of the image layer 104a with respect to the image layer 106a.

The modified image data 138 may include an image layer 104b corresponding to the image layer 104a and may further include an image layer 106b corresponding to the image layer 106a. The image layer 104b may include clusters 108b, 110b corresponding to the clusters 108a, 110a, and the image layer 106b may include clusters 112b, 114b corresponding to the clusters 112a, 114a. The example of FIG. 1 illustrates that the cluster 108b has an attribute 140 that has been modified (e.g., based on the user input) relative to the attribute 116. To illustrate, the user input may indicate modification of a color attribute, a sharpness attribute, a blurring attribute, and/or a context attribute of the image data 102 to cause the processor 100 to generate the modified image data 138. Further, the example of FIG. 1 illustrates that the attribute 116 has been modified to generate the attribute 140 independently of one or more other attributes, such as independently of the attributes 118b, 120b, and 122b (which may remain unchanged relative to the attributes 118a, 120a, and 122a or which may be adjusted, depending on the particular user input).

The techniques of FIG. 1 illustrate independent adjustment of multiple layers of an image to achieve one or more visual effects. The example of FIG. 1 therefore enables increased user control of image editing operations of a device that includes the processor 100. As a particular illustrative example, a user of a device may independently modify an attribute of a foreground of an image relative to an attribute of a background of the image, such as by "blurring" the background but not the foreground (or vice versa). As a particular example, the background may be blurred to approximate a "super focus" camera effect.

Further, FIG. 1 describes an example of a "superpixel-based grabcut" technique for extracting image layers. Certain conventional image processing techniques attempt to segment an image "globally" (or on a "per pixel" basis). The example of FIG. 1 identifies clusters of the image data 102 and segments an image based on the clusters, which may improve performance of image processing operations as compared to global techniques. Further, image refinement operations (e.g., one or more algorithm iterations to "correct" one or more boundaries of an image layer or object) may be accelerated using the superpixel-based grabcut technique as compared to a global technique that analyzes image data on a per-pixel basis. In addition, it has been discovered that edge recall and compactness are two features of a clustering technique (e.g., SLIC). Edge recall may be associated with enhanced boundary detection, and compactness may be useful in connection with an image segmenting operation (e.g., grabcut). Accordingly, a device that utilizes a superpixel-based grabcut technique may feature improved performance.

Figure 2:
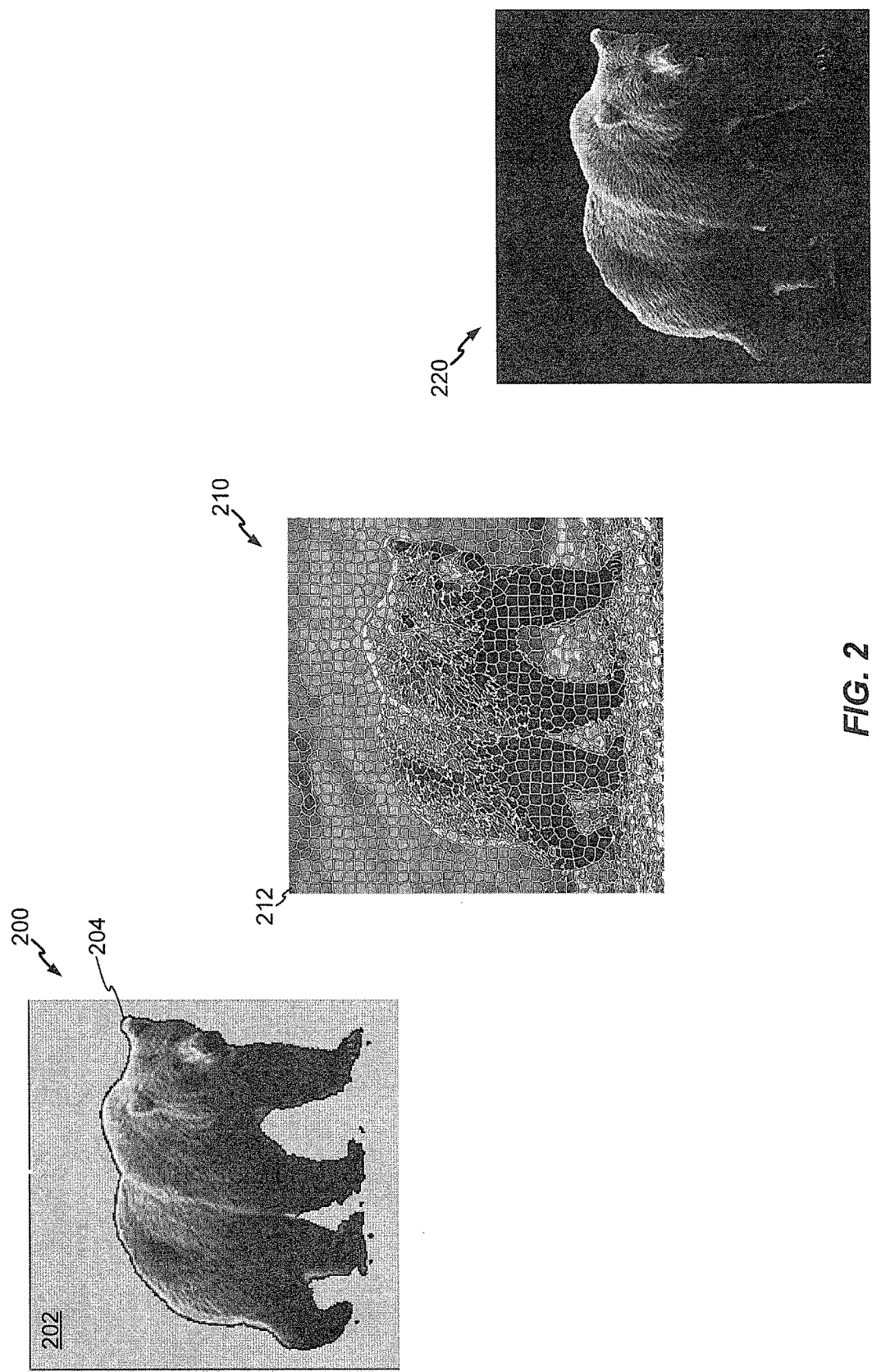
FIG. 2 illustrates aspects of certain example image processing operations that may be performed by the processor of FIG. 1.

Referring to FIG. 2, an example of an image is depicted and generally designated 200. The image 200 includes a background 202 and a foreground 204. In a particular example, the background 202 corresponds to the image layer 104a, and the foreground 204 corresponds to the image layer 106a. The image 200 may correspond to the image data 102 (e.g., the image data 102 may represent the image 200).

FIG. 2 further illustrates a clustered image 210. The clustered image 210 may be generated by the cluster identifier 124. The clustered image 210 includes multiple clusters of pixels of the image 200, such as a representative cluster 212. The cluster 212 may be identified by the cluster identification 126.

FIG. 2 further illustrates a resulting image 220. The resulting image 220 illustrates adjustment of a first attribute of a first layer of the image 200 independently of a second attribute of a second layer of the image 200 based on the clustered image 210. For example, as illustrated in FIG. 2, the background portion 202 of the image 200 has been removed to generate the resulting image 220. To illustrate, the background 202 may be removed based on the clustered image 210, such as based on similarities of clusters of the clustered image 210. In a particular embodiment, predetermined content can be substituted for the background 202. As a particular illustrative example, a forest scene corresponding to the background 202 may be replaced with a beach scene (or another scene).

The example of FIG. 2 illustrates independent modification of layers of an image. A user of a device may therefore experience greater control of image editing operations as compared to a device that applies image editing effects to an entire image.

Figure 3:
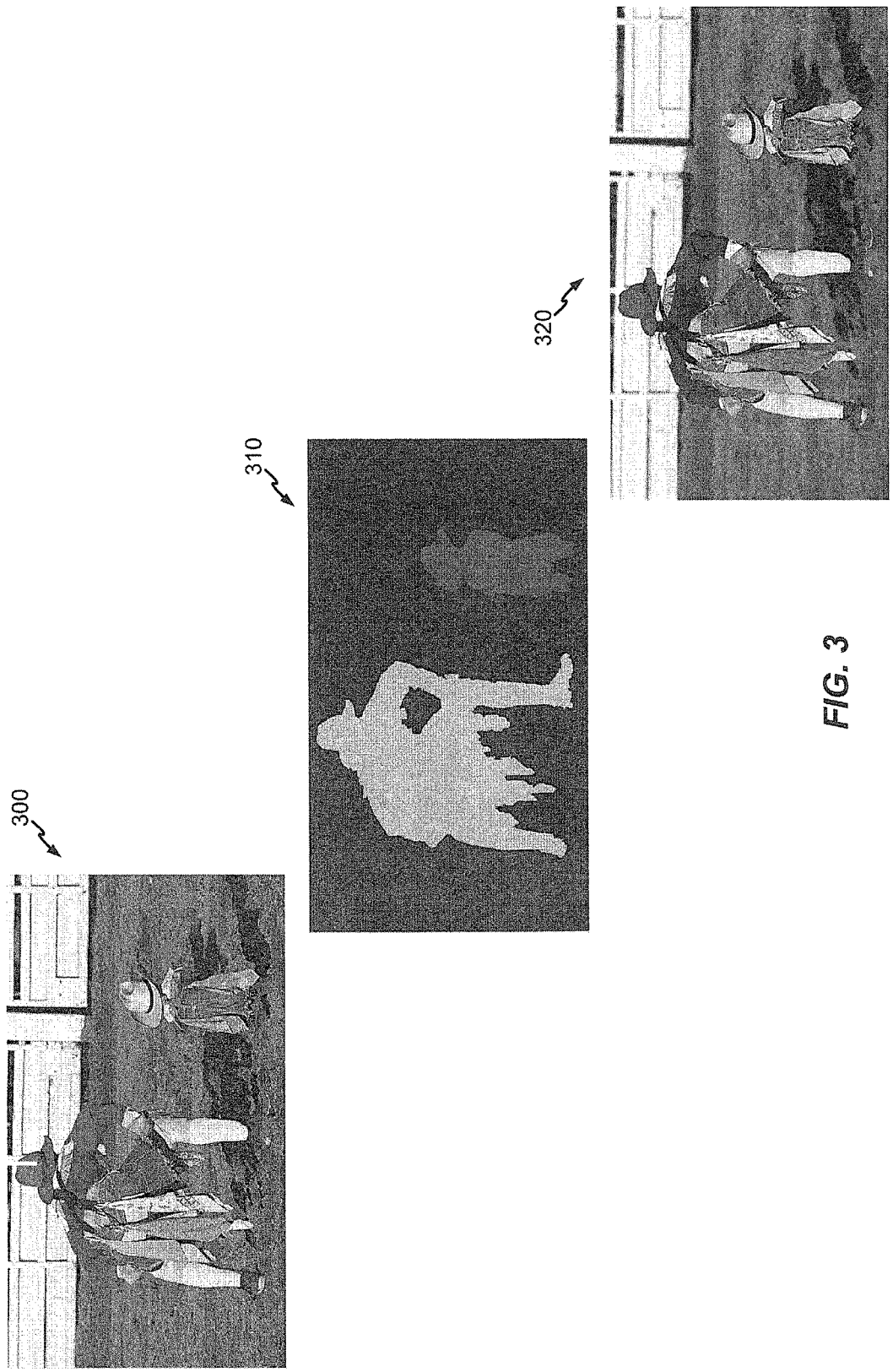
FIG. 3 illustrates additional aspects of example image processing operations that may be performed by the processor of FIG. 1.

FIG. 3 depicts an example of an image 300, an illustrative depiction of a segmentation mask 310 corresponding to the image 300, and a modified image 320. In FIG. 3, the modified image 320 is generated using the segmentation mask 310 to modify the image 300. For example, as illustrated in FIG. 3, the segmentation mask 310 identifies multiple foreground objects. The image segment generator 128 of FIG. 1 may segment the image 300 by segmenting the multiple foreground objects relative to a background of the image 300. In this manner, independent modification of image layer attributes is enabled.

By segmenting multiple layers of the image 300, multiple layers of the image 300 can be independently adjusted. In the example of FIG. 3, the modified image 320 includes a blurred background. Further, the modified image 320 may include one or more foreground objects that have been modified relative to the image 300, such as by changing a color attribute of the one or more foreground objects. To illustrate, the segmentation mask 310 identifies multiple foreground objects which each can be independently modified relative to each other (and relative to the background), such as by modifying a shirt color of one foreground object independently of a shirt color of another foreground object.

The example of FIG. 3 illustrates that a segmentation mask (such as the segmentation mask 310) may be used to enable independent adjustment of attributes of layers of an image. For example, the segmentation mask 310 may enable independent color adjustment of foreground portions of the image 300.

Figure 4:
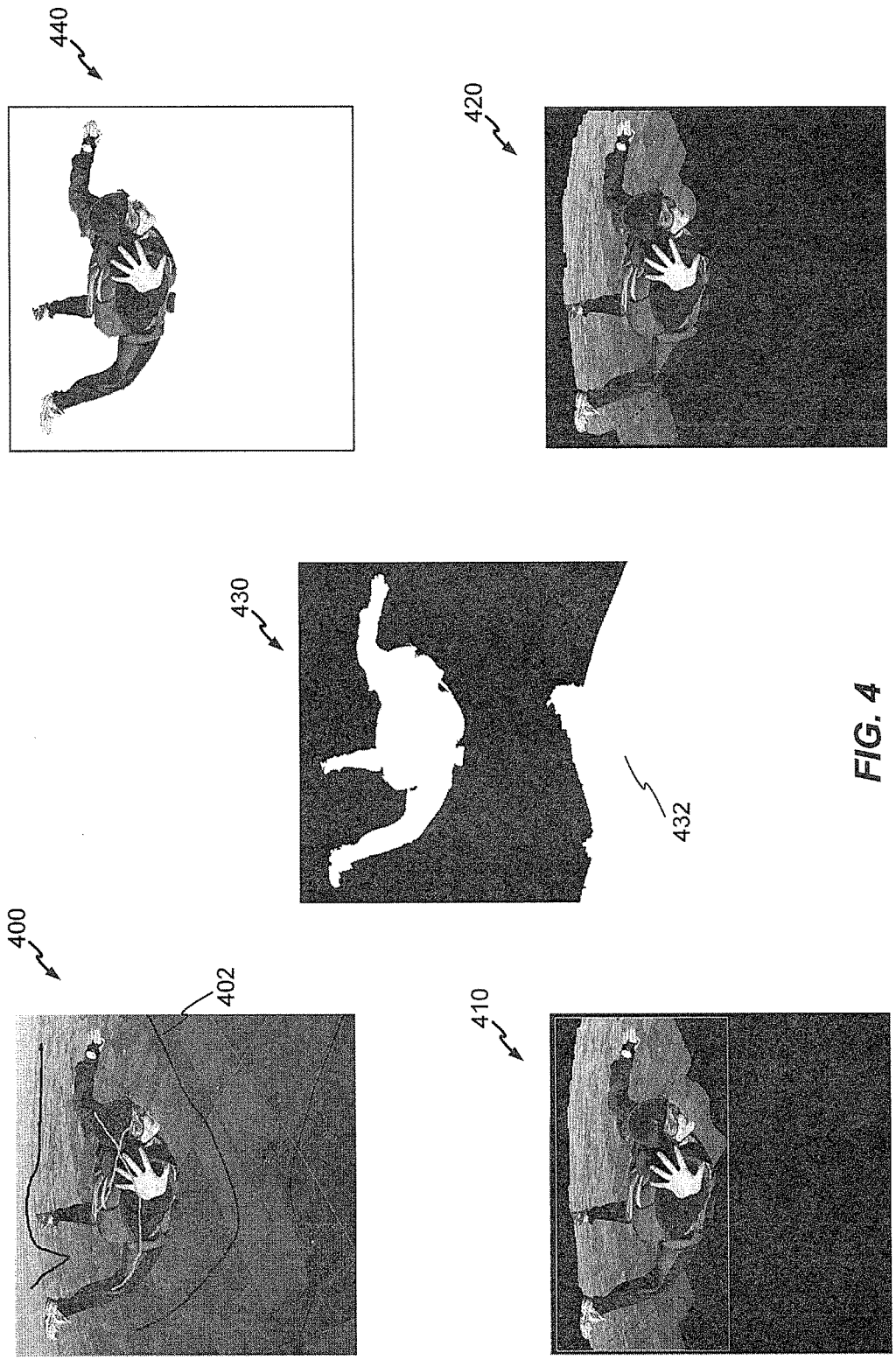
FIG. 4 illustrates additional aspects of example image processing operations that may be performed by the processor of FIG. 1.

Referring to FIG. 4, an image is depicted and generally designated 400. The image 400 may be displayed at a user interface (UI). The UI may enable a user to independently adjust a first attribute of a first layer of the image 400 relative to a second attribute of a second layer of the image 400. To illustrate, the example of FIG. 4 illustrates user input 402. The user input 402 may correspond to a swipe action at a display device by a user, such as at a display device of a mobile device displaying the image 400. In the example of FIG. 4, the user input 402 may indicate an image layer of the image 400, such as an image background. The user input 402 may indicate at least a threshold number of pixels of the UI in order to select the image layer of the image 400. To illustrate, if a user accidentally touches the UI to generate the user input 402, the user input 402 may indicate fewer than the threshold number of pixels, and the user input 402 may not cause selection of the layer. Alternatively, if the user input 402 indicates at least the threshold number of pixels, then the user input 402 may cause selection of the layer.

FIG. 4 further illustrates an image 410. In the image 410, a background portion has been removed, such as in response to the user input 402. For example, if the user input 402 designates a background portion of the image 400, the background portion of the image 400 may be removed using a cluster identification and/or segmentation technique, such as one or more techniques described with reference to FIGS. 1-3.

FIG. 4 further illustrates an image 420 corresponding to a refinement of the image 410. For example, based on additional user input, an additional background portion of the image 410 may be removed to generate the image 420.

In FIG. 4, user input may be received to update the image 420 to remove one or more additional background portions. For example, additional user input may be received to generate a segmentation mask 430. The segmentation mask 430 includes an image artifact 432. The image artifact 432 may correspond to the image artifact 134 of FIG. 1. To illustrate, operation of the image segment generator 128 may generate a segmentation mask 130 corresponding to the segmentation mask 430. However, the segmentation mask 130 may include one or more image artifacts, such as the image artifact 432. In a particular embodiment, the image component labeler 132 is operative to remove the image artifact 432 to generate an image 440. The image 400 may correspond to the modified image data 138.

FIG. 4 illustrates techniques to enable greater control by a user of image editing operations. FIG. 4 further illustrates removal of an image artifact, such as the image artifact 432, to further improve quality of image editing operations. The techniques of FIG. 4 may be utilized in connection with a user interface (UI), as described further with reference to FIG. 5.

Figure 5:
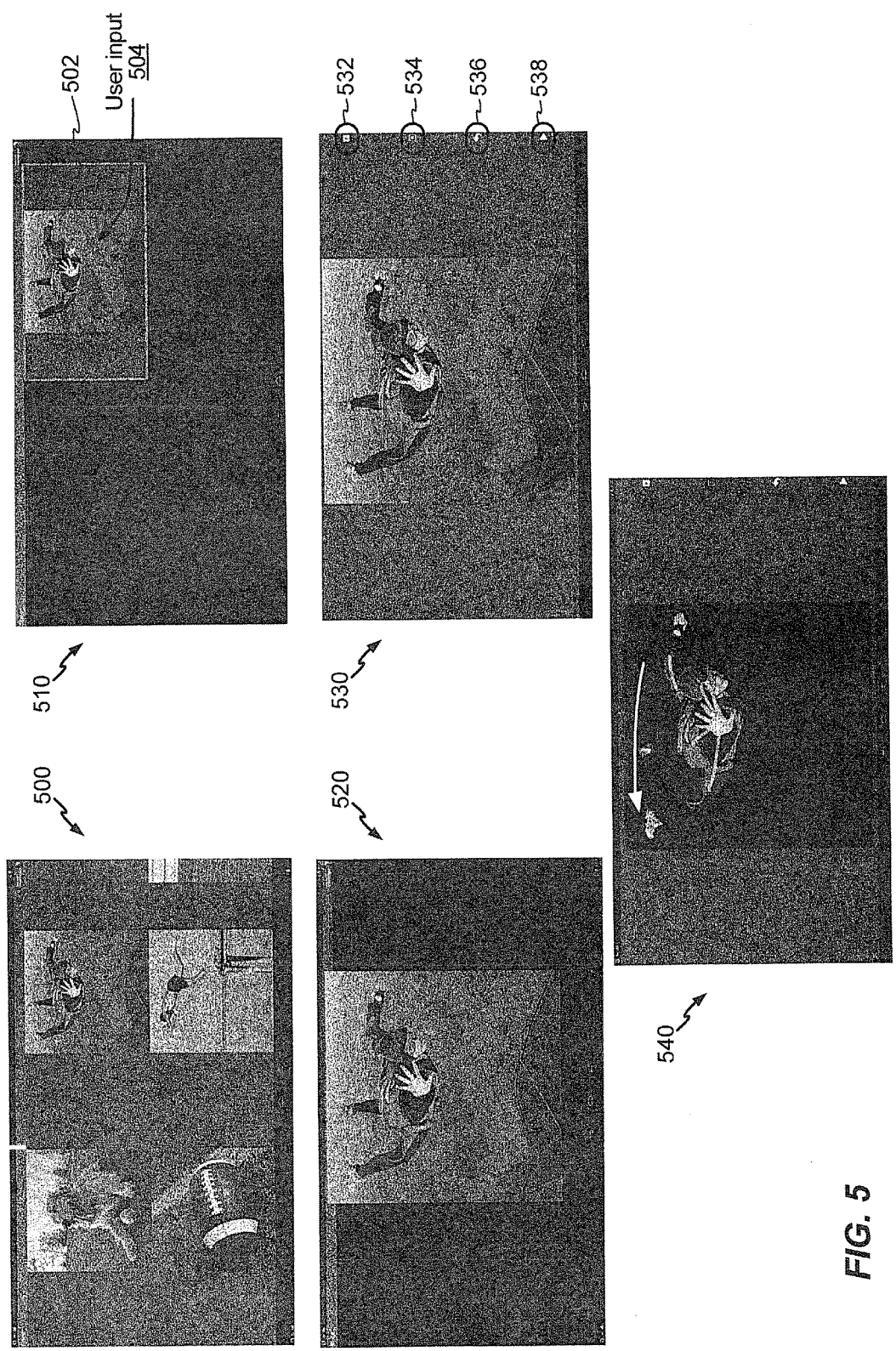
FIG. 5 illustrates additional aspects of example image processing operations that may be performed by the processor of FIG. 1.

FIG. 5 illustrates an example of a user interface (UI) 500. The UI 500 may be presented at a display, such as at a display of a mobile device. The display may correspond to a touchscreen display configured to receive user input. In the example of FIG. 5, the UI 500 indicates multiple images that are presented to a user in connection with an image editing application (e.g., a mobile device application that graphically presents images and that facilitates image editing operations on the images).

FIG. 5 further illustrates a UI 510 corresponding to the UI 500 upon selection of an image 502. In response to user input 504 indicating the image 502, the image editing application may enlarge the image 502 to generate a UI 520 (e.g., by enlarging the image from a thumbnail view to a full view). The user input 504 may correspond to a swipe action or a tap action at the UI 510, as illustrative examples.

In a particular illustrative embodiment, a user interface (UI) 530 depicts the image 502 in connection with multiple buttons, such as buttons 532, 534, 536, 538. The buttons 532, 534, 536, and 538 may be assigned one or more operations, such as adjustment of image attributes of the image 502.

To illustrate, a user may select the button 534. The button 534 may be selected by a user to facilitate indication of a background or foreground portion of the image depicted by the UI 530. To further illustrate, FIG. 5 illustrates a UI 540 in which user input is received to designate a background and/or foreground of the image 502. The user input may correspond to the user input 402 of FIG. 4. As a particular illustration, a user may select the button 534 (e.g., to enter a background designation mode of operation) and then enter user input (e.g., the user input 402) to designate a background portion of the image displayed at the UI 540. The user input may correspond to a swipe action that designates a background portion of the image. One or more of the buttons 532, 536, and 538 may function as a foreground designation button usable to designate a foreground portion of the image. One or more of the buttons 532, 536, 538 may correspond to default operations (e.g., associated with a particular image editing application) and/or user-defined operations (e.g., user-defined operations based on user preference input).

To further illustrate, if multiple objects within an image layer are identified, the buttons 532, 536, and 538 may enable a user to select between the multiple objects. As a particular example, if multiple foreground objects are identified (e.g., in connection with the image 300 of FIG. 3), then the button 536 may be used to designate a first foreground object, and the button 538 may be used to designate a second foreground object. In this example, after pressing the button 536, a user swipe action indicating the first foreground object may initiate an image editing operation targeting the first foreground object. Similarly, after pressing the button 538, a user swipe action indicating the second foreground object may initiate an image editing operation targeting the second foreground object.

FIG. 5 illustrates enhanced user interface (UI) techniques to enable a user to simply and effectively control image editing operations. For example, a user may designate a background portion (or a foreground portion) of an image using the button 534 as described in the example of FIG. 5.

Figure 6:
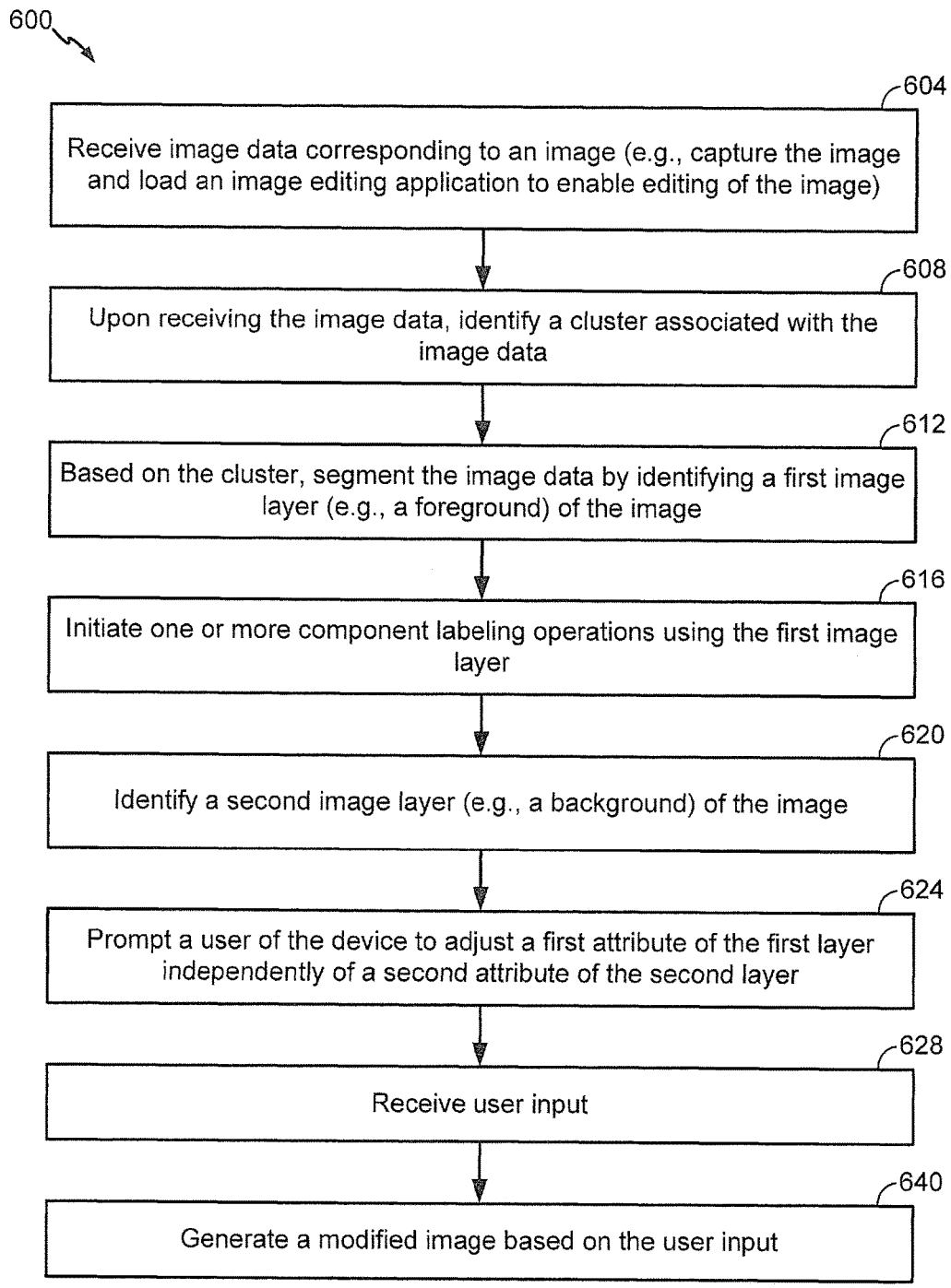
FIG. 6 is a flow diagram illustrating a method that may be performed by the processor of FIG. 1.

Referring to FIG. 6, a particular illustrative embodiment of a method is depicted and generally designated 600. The method 600 may be performed at a device, such as at a mobile device that includes a processor. In a particular illustrative embodiment, the method 600 is performed by the processor 100 of FIG. 1.

The method 600 includes receiving image data corresponding to an image, at 604. The image data may correspond to the image data 102. The image may correspond to an image captured by a camera, and the image data may be loaded in connection with an image editing application to enable editing of the image. The method 600 may further include identifying a cluster associated with the image data, at 608. In a particular example, the cluster identifier 124 may identify a cluster of the image data 102, such as the cluster 108a.

The method 600 may further include segmenting the image data by identifying a first image layer of the image based on the cluster, at 612. To illustrate, the cluster identifier 124 may provide the cluster identification 126 to the image segment generator 128. Based on the cluster identification 126, the image segment generator 128 may segment the image data by identifying a foreground portion of the image. The image segment generator 128 may generate the segmentation mask 130 to enable independent modification of image layers of the image.

The method 600 may further include initiating one or more component labeling operations using the first image layer, at 616. The method 600 may further include identifying a second image layer (e.g., a background) of the image, at 620. The method 600 may further include prompting a user of the device to adjust a first attribute of the first image layer independently of a second attribute of the second image layer, at 624. As a particular example, a user of the device may be prompted to adjust the attribute 116 (e.g., to generate the attribute 140) independently of one or more of the attributes 118a, 120a, and 122a.

The method 600 may further include receiving user input, at 628. In a particular embodiment, the user input is received at a display of the device, such as at a touchscreen. The method 600 may further include generating a modified image based on the user input, at 640. The modified image may correspond to the modified image data 138 of FIG. 1.

The method 600 of FIG. 6 enables simplified and efficient control of image editing operations by a user. For example, the method 600 may be utilized in connection with portable device (e.g., a mobile device having a touchscreen user interface) while still enabling a high level of user control over image editing operations (e.g., independent adjustment of layers of an image).

Figure 7:
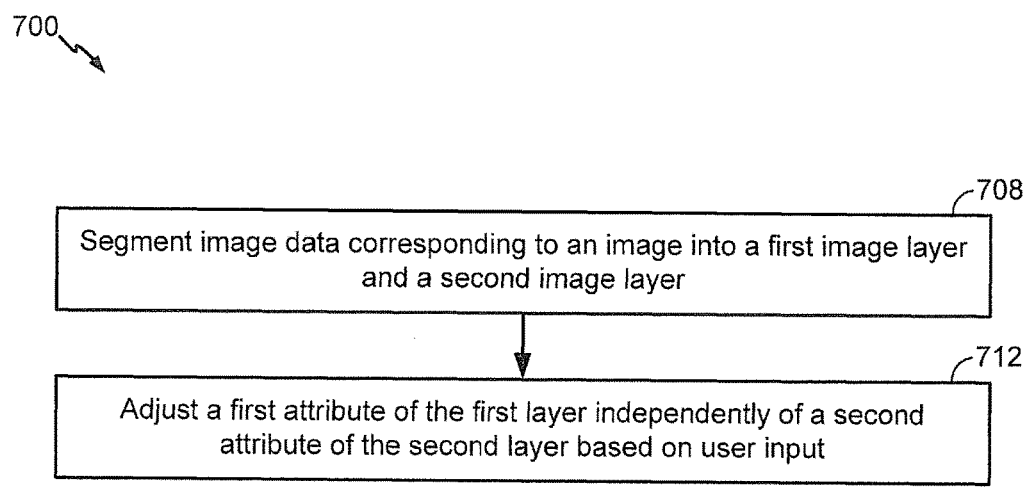
FIG. 7 is a flow diagram illustrating another method that may be performed by the processor of FIG. 1.

Referring to FIG. 7, a particular illustrative embodiment of a method is depicted and generally designated 700. The method 700 may be performed at a device, such as at a mobile device that includes a processor. In a particular illustrative embodiment, the method 700 is performed by the processor 100 of FIG. 1.

The method 700 includes segmenting image data corresponding to an image into a first image layer and a second image layer, at 708. The first image layer and the second image layer may respectively correspond to the image layers 104a, 106a, as illustrative examples.

The method 700 may further include adjusting a first attribute of the first image layer independently of a second attribute of the second image layer based on user input, at 712. In a particular example, the first attribute corresponds to the attribute 116, and the second attribute corresponds to one or more of the attributes 120a, 122a.

The method 700 facilitates enhanced image editing operations. For example, an image editing operation may separately target image layers (e.g., background and foreground) to achieve a different image editing effect on one image layer relative to another image layer.

Figure 8:
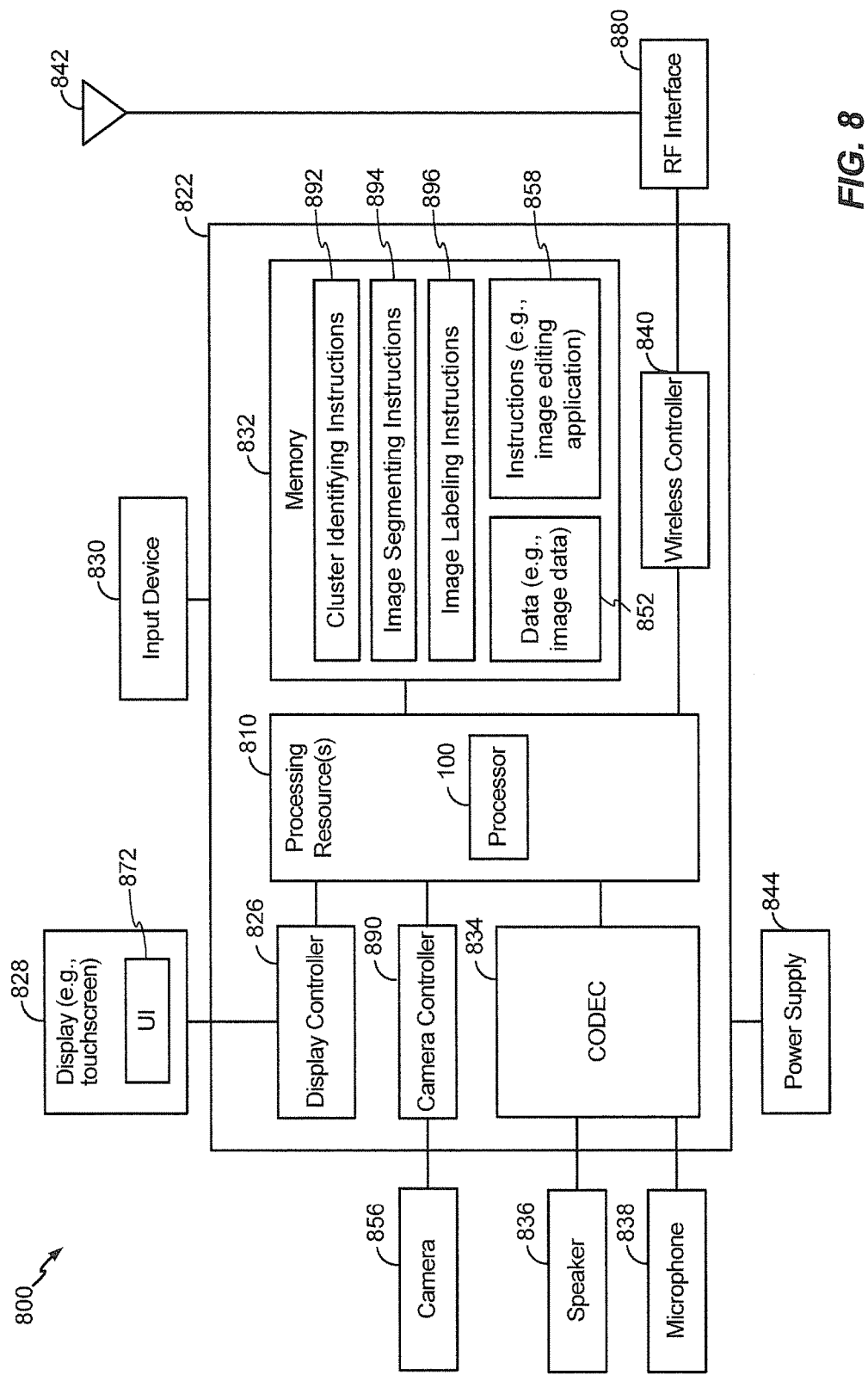
FIG. 8 is a block diagram of a particular illustrative embodiment of a mobile device that may include the processor of FIG. 1.

Referring to FIG. 8, a block diagram of a particular illustrative embodiment of a mobile device is depicted and generally designated 800. The mobile device 800 may include one or more processing resources 810. The one or more processing resources 810 include the processor 100. The one or more processing resources 810 may be coupled to a computer-readable medium, such as to a memory 832 (e.g., a non-transitory computer-readable medium). The memory 832 may store instructions 858 executable by the one or more processing resources 810 and data 852 usable by the one or more processing resources 810. The memory 832 may further store cluster identifying instructions 892, image segmenting instructions 894, and/or image labeling instructions 896.

The mobile device 800 may include a camera having an image sensor, such as a charge-coupled device (CCD) image sensor and/or a complementary metal-oxide-semiconductor (CMOS) image sensor. For example, FIG. 8 depicts that a camera 856 may be coupled to a camera controller 890. The camera controller 890 may be coupled to the one or more processing resources 810. The instructions 858 may include an image editing application executable by the processing resources 810 to edit one or more images captured by the camera 856, and the data 852 may include image data corresponding to the one or more images, such as the image data 102.

FIG. 8 also shows a display controller 826 that is coupled to the one or more processing resources 810 and to a display 828. The display may be configured to present a user interface (UI) 872. In a particular embodiment, the display 828 includes a touchscreen, and the UI 872 is responsive to user operations at the touchscreen (e.g., a swipe operation).

A coder/decoder (CODEC) 834 can also be coupled to the one or more processing resources 810. A speaker 836 and a microphone 838 can be coupled to the CODEC 834. FIG. 8 also indicates that a wireless controller 840 can be coupled to the one or more processing resources 810. The wireless controller 840 may be further coupled to an antenna 842 via a radio frequency (RF) interface 880.

In a particular embodiment, the one or more processing resources 810, the memory 832, the display controller 826, the camera controller 890, the CODEC 834, and the wireless controller 840, are included in a system-in-package or system-on-chip device 822. An input device 830 and a power supply 844 may be coupled to the system-on-chip device 822.

Moreover, in a particular embodiment, and as illustrated in FIG. 8, the display 828, the input device 830, the camera 856, the speaker 836, the microphone 838, the antenna 842, the RF interface 880, and the power supply 844 are external to the system-on-chip device 822. However, each of the display 828, the input device 830, the camera 856, the speaker 836, the microphone 838, the antenna 842, the RF interface 880, and the power supply 844 can be coupled to a component of the system-on-chip device 822, such as to an interface or to a controller.

In connection with the described embodiments, a non-transitory computer-readable medium stores instructions. The non-transitory computer-readable medium may correspond to the memory 832, and the instructions may include any of the cluster identifying instructions 892, the image segmenting instructions 894, the image labeling instructions 896, and/or the instructions 858. The instructions are executable by a processor (e.g., the processor 100) to cause the processor to segment image data associated with an image into a first image layer and a second image layer. The image data may correspond to the image data 102, and the first image layer and the second image layer may correspond to the image layers 104a, 106a. The instructions are further executable by the processor to adjust a first attribute of the first image layer independently of a second attribute of the second image layer based on user input. The first attribute and the second attribute may correspond to the attributes 116, 120a, as an illustrative example.

In another particular embodiment, an apparatus (e.g., the processor 100) includes means for segmenting image data associated with an image into a first image layer and a second image layer. The first image layer and the second image layer may correspond to the image layers 104a, 106a. The means for segmenting the image data may correspond to the image segment generator 128, and the image data may correspond to the image data 102. The apparatus further includes means for adjusting a first attribute of the first image layer independently of a second attribute of the second image layer based on user input. The means for adjusting the first attribute may correspond to the image modifier 136. The first attribute and the second attribute may correspond to the attributes 116, 120a, as an illustrative example.

Figure 9:
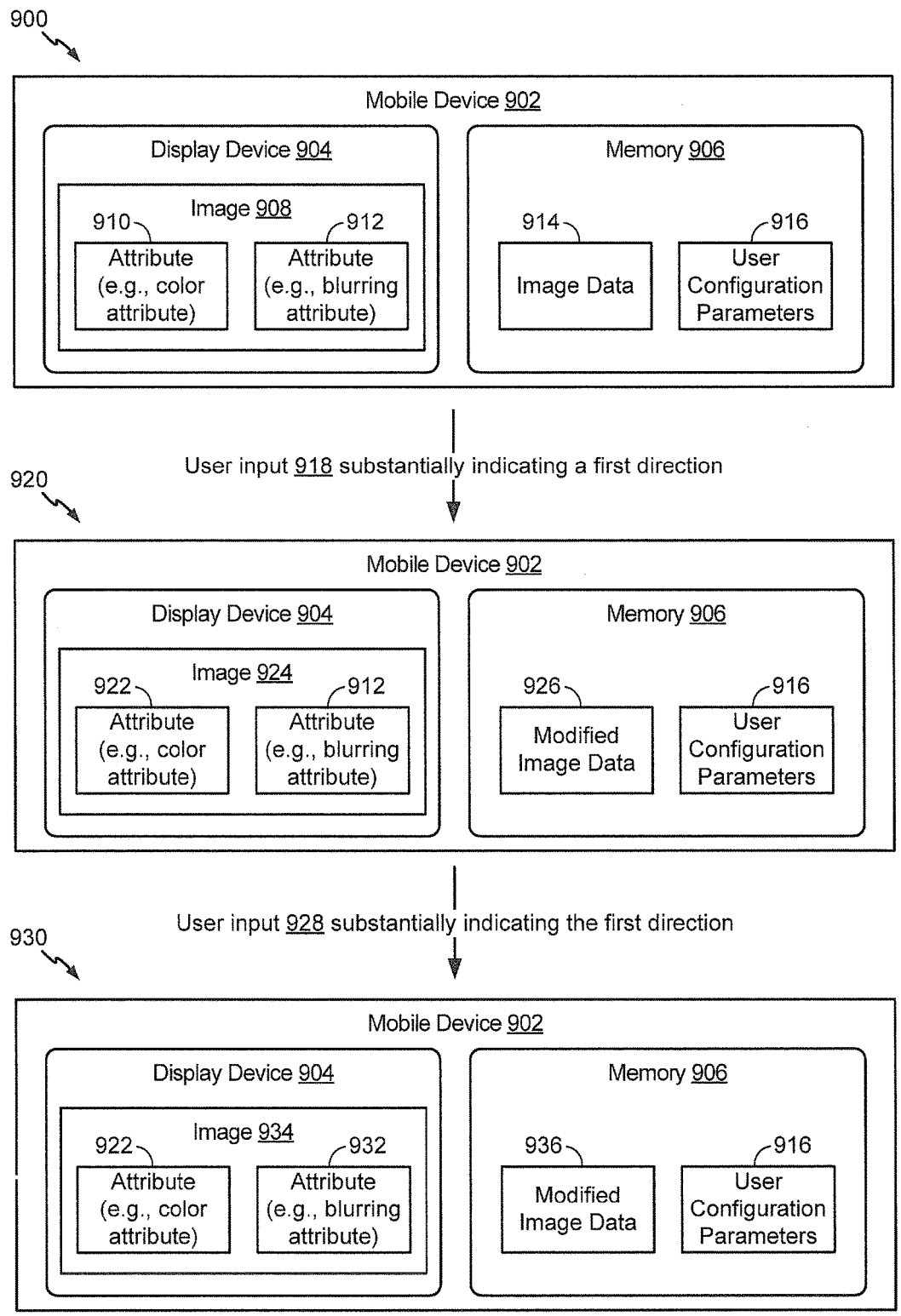
FIG. 9 is a block diagram illustrating example operating states of a mobile device.

Referring to FIG. 9, a first operating state of a mobile device 902 is depicted and generally designated 900. The mobile device 902 may include the processor 100 (not shown in FIG. 9). Alternatively or in addition, the mobile device may include another processor.

The mobile device 902 includes a display device 904 and a memory 906. The display device 904 may display an image 908 having an attribute 910 (e.g., a color attribute) and further having an attribute 912 (e.g., a blurring attribute). The attributes 910, 912 may correspond to a common layer or to separate layers of the image 908. In a particular example, the attribute 910 corresponds to the attribute 116 of the image layer 104a, and attribute 912 corresponds to the attribute 120a of the image layer 106a.

The memory 906 may store image data 914 corresponding to the image 908 and may further store one or more user configuration parameters 916. The user configuration parameters 916 may determine how user input received at the mobile device 902 affects one or more of the attributes 910, 912. To illustrate, user input 918 may be received at the mobile device 902. The user input 918 may substantially indicate a first direction, such as a vertical direction or a horizontal direction relative to the mobile device 902.

As used herein, user input may "substantially" have a direction if, depending on the particular device configuration and/or application, the user input would be recognized by a device as indicating the direction. To illustrate, a swipe input may not be precisely vertical but may be substantially vertical if a device would recognize the swipe input as indicating the vertical direction. As a particular non-limiting example, a device may be configured such that if a swipe operation has a certain vector component within the direction, then the swipe operation is recognized as indicating the direction. For example, user input at a device may be resolved into multiple directional components (e.g., vectors) by the device. The device may compare the multiple directional components to determine a ratio of the multiple directional components. If the ratio exceeds a threshold, the device may determine that the user input indicates the direction. To further illustrate, if the user input is not a straight line (or is not approximately straight), the device may approximate the user input by "fitting" (e.g., interpolating) points associated with the user input to a line according to a technique. The technique may include a "minimum mean squared error" (MMSE) technique, as an illustrative example.

The user configuration parameters 916 may indicate that user input indicating the first direction indicates a first image editing operation to be performed on the image 908. For example, the user configuration parameters 916 may indicate that user input indicating the first direction indicates a color attribute change operation. In a particular embodiment, the user input 918 includes a swipe operation (e.g., a vertical or a horizontal swipe). It should be appreciated that in one or more alternate examples the user input 918 may include another operation, such as a hover operation, a tap operation, a stylus input operation, an infrared (IR)-based operation, a pointing gesture (e.g., in connection with a multi-camera arrangement configured to detect pointing gestures), or another operation, depending on the particular implementation.

FIG. 9 further indicates a second operating state 902 of the mobile device 902. In the second operating state 920, the attribute 910 has been modified based on the user input 918, generating an attribute 922. The mobile device 902 may generate modified image data 926 in response to the user input 918.

User input 928 may be received at the mobile device 902. The user input 928 may substantially indicate the first direction. The user configuration parameters 916 may indicate that user input identifying the first direction is to cause another image editing operation on the image 908. For example, a third operating state 930 of the mobile device 902 indicates that the attribute 912 has been modified based on the user input 928 to generate an attribute 932. The attribute 932 may correspond to a blurring of an image layer of the image 908. The mobile device 902 may generate modified image data 936 indicating the attribute 932. The modified image data 936 may correspond to the modified image data 926 with a "blurring" effect (e.g., after application of a Gaussian blurring technique to the modified image data 926).

In a particular embodiment, user input indicating a first direction indicates a first image editing operation. To illustrate, a horizontal swipe action may indicate a color change operation that targets a particular layer of an image (e.g., a foreground). One or more subsequent horizontal swipe actions may "cycle" through different color change operations (e.g., red to blue to green, etc.). User input indicating a second direction may indicate a second image editing operation, such as an image editing operation to a different layer of the image. For example, a vertical swipe action may select or cause an image blurring operation, such as to a background of the image. One or more subsequent vertical swipe actions may select or cause one or more additional image editing operations to the background, such as by replacing the background with predetermined content (e.g., a beach scene) and/or other content. Thus, in one embodiment, swiping in a first direction (e.g., vertically) may cycle between different available image editing operations (e.g., visual effects), and swiping in a second direction (e.g., horizontally) may cycle between different options (e.g., colors, blurring intensities, etc.) for a selected image editing operation. In an alternate embodiment, swiping in different directions or along different axes may correspond to different image editing operations (e.g., swiping up/down for color changes, swiping left/right for blurring, swiping diagonally for background scene replacement, etc.). The particular directions associated with user input operations may be configured by a user. For example, the user configuration parameters 916 may be user-configurable to indicate that a diagonal swipe action is to indicate color change operations (e.g., instead of the horizontal direction) or to indicate image blurring operations (e.g., instead of the vertical direction). User configuration of the user configuration parameters 916 is described further with reference to FIG. 11.

The example of FIG. 9 illustrates simplified control of image editing operations. For example, because the user input 918, 928 correspond to respective image editing operations, a user of the mobile device 902 may perform multiple image editing operations using a convenient and fast input method (e.g., a swipe action), reducing complexity of image editing operations.

Figure 10:
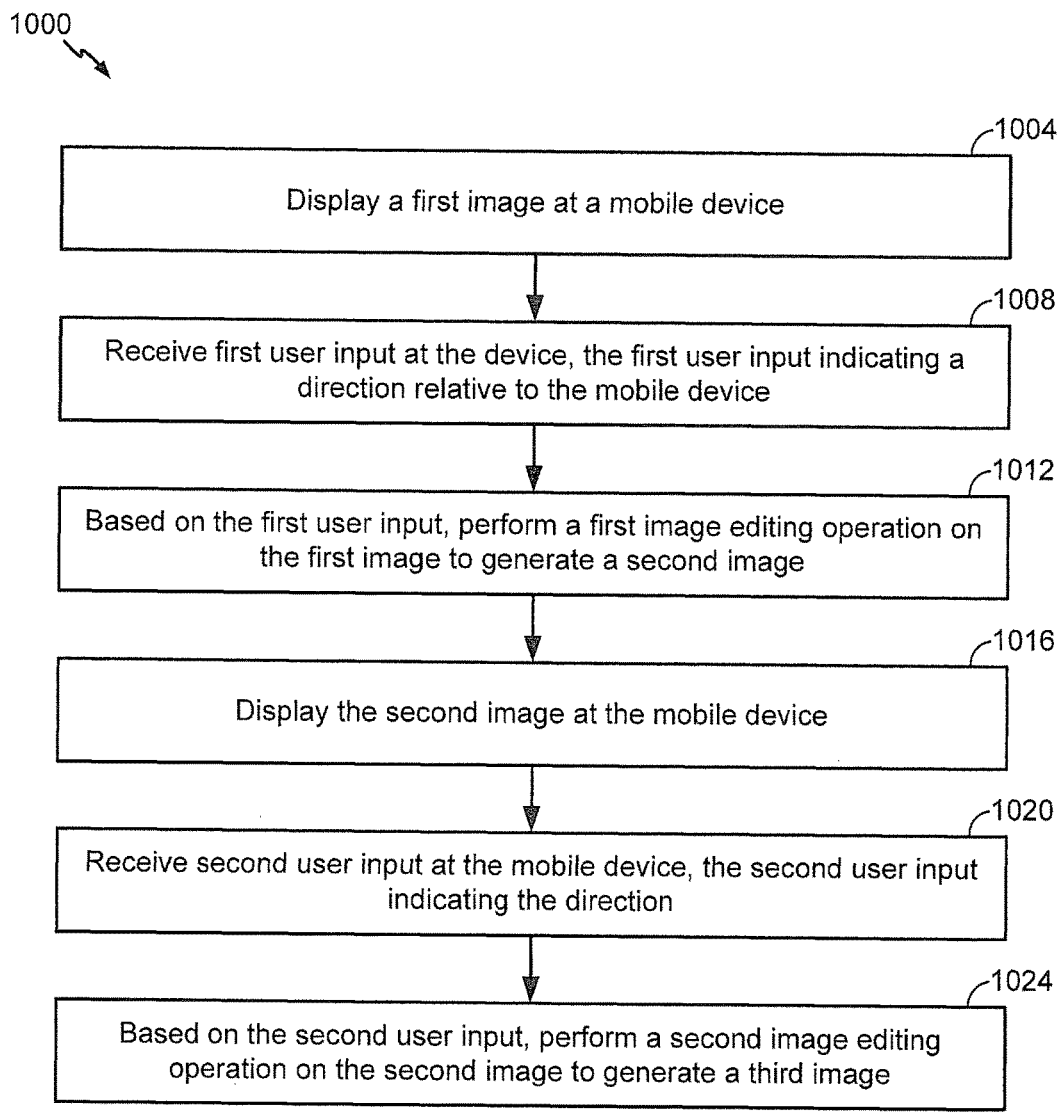
FIG. 10 is a flow diagram illustrating a method that may be performed by the mobile device of FIG. 9.

Referring to FIG. 10, a particular illustrative embodiment of a method is depicted and generally designated 1000. The method 1000 includes displaying a first image at a mobile device, at 1004. The mobile device may correspond to the mobile device 902, and the first image may correspond to the image 908.

The method 1000 further includes receiving first user input at the mobile device, at 1008. The first user input indicates a direction relative to the mobile device. For example, the first user input may indicate a vertical direction or a horizontal direction. The first user input may correspond to the user input 918.

The method 1000 may further include performing a first image editing operation on the first image based on the first user input to generate a second image, at 1012. The first image editing operation may generate the image 924, such as by modifying the attribute 910 to generate the attribute 922. As a particular example, the first image editing operation may include modifying a color attribute of the image 908 to generate the image 924.

The method 1000 may further include displaying the second image at the mobile device, at 1016. For example, the image 924 may be displayed at the display device 904 of the mobile device 902.

The method 1000 may further include receiving second user input at the mobile device, at 1020. The second user input indicates the direction. In one or more other configurations, the second user input may substantially indicate another direction relative to the mobile device (e.g., a horizontal direction instead of a vertical direction indicated by the first user input, etc.). The second user input may correspond to the user input 928.

The method 1000 may further include performing a second image editing operation on the second image to generate a third image, at 1024. For example, the second image editing operation may modify the attribute 912 to generate the attribute 932, such as by blurring a layer of the image 924. The third image may correspond to the image 934.

The method 1000 may optionally include receiving third user input indicating the direction relative to the mobile device. The third user input corresponds to a command to undo the first image editing operation and the second image editing operation. To illustrate, if a user of the mobile device is unsatisfied with the first image editing operation and the second image editing operation, the user may "repeat" the user input (e.g., a swipe operation substantially in a particular direction) to "undo" the first image editing operation and the second image editing operation.

The method 1000 illustrates simplified control of image editing operations. For example, a user of a mobile device may perform multiple image editing operations using a particular input method (e.g., a swipe action), reducing complexity of image editing operations. Further, as described with reference to FIG. 11, a user may reconfigure user configuration parameters, such as to adjust an order of image editing operations.

Figure 11:
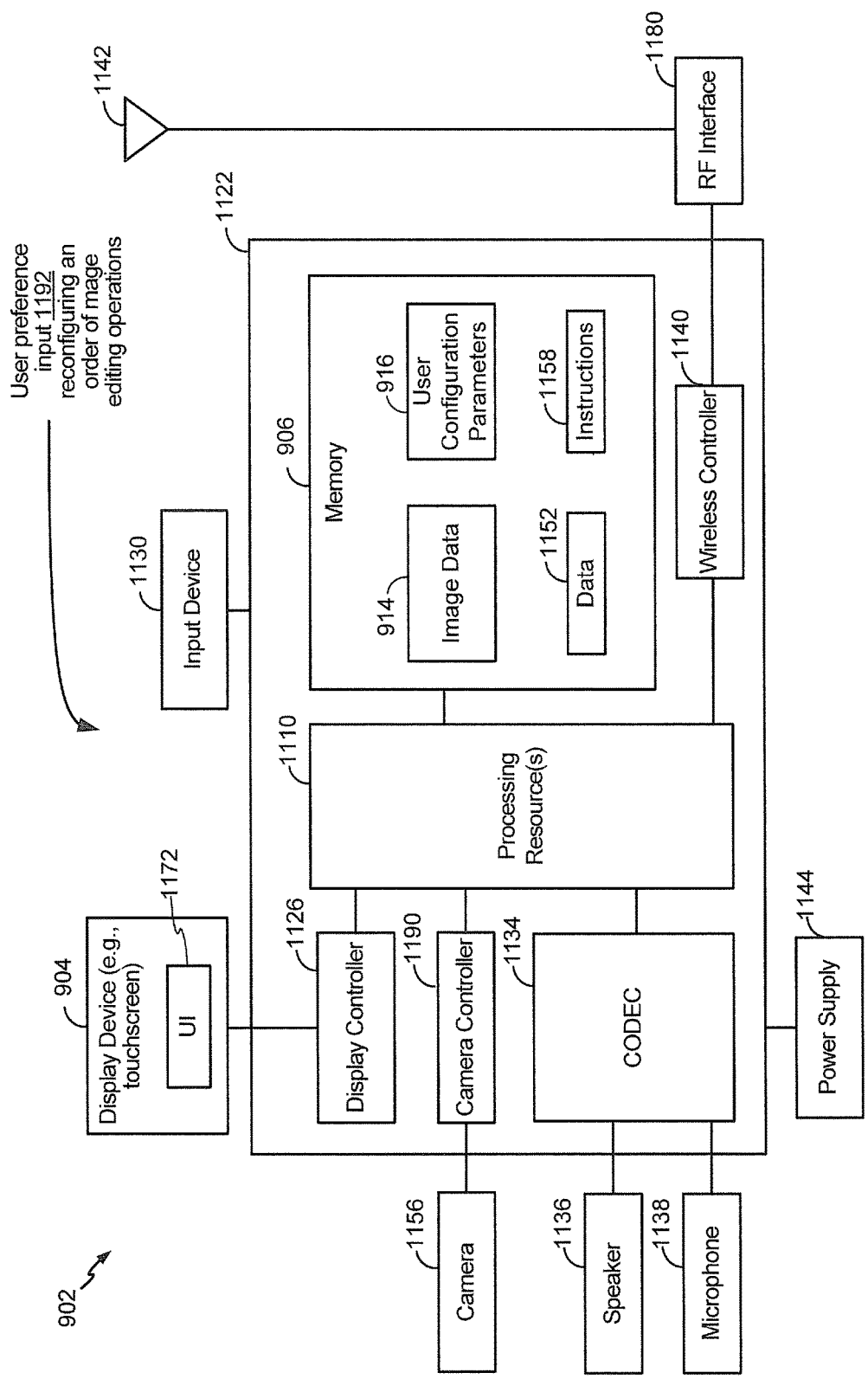
FIG. 11 is a block diagram of a particular illustrative embodiment of the mobile device of FIG. 9.

FIG. 11 depicts a particular illustrative embodiment of the mobile device 902. The mobile device 902 may include one or more processing resources 1110 (e.g., a processor, such as the processor 100, another processor, or a combination thereof). The one or more processing resources 1110 may be coupled to a computer-readable medium, such as to the memory 906 (e.g., a non-transitory computer-readable medium). The memory 906 may store instructions 1158 executable by the one or more processing resources 1110 and data 1152 usable by the one or more processing resources 1110. The memory 906 may store the image data 914 and the user configuration parameters 916.

The mobile device 902 may include a camera having an image sensor, such as a charge-coupled device (CCD) image sensor and/or a complementary metal-oxide-semiconductor (CMOS) image sensor. For example, FIG. 11 depicts that a camera 1156 may be coupled to a camera controller 1190. The camera controller 1190 may be coupled to the one or more processing resources 1110. The image data 914 may correspond to an image captured by the camera 1156.

FIG. 11 also shows a display controller 1126 that is coupled to the one or more processing resources 1110 and to the display device 904. The display device 904 may be configured to present a user interface (UI) 1172. In a particular embodiment, the display device 904 includes a touchscreen, and the UI 1172 is responsive to user operations at the touchscreen (e.g., a swipe operation).

A coder/decoder (CODEC) 1134 can also be coupled to the one or more processing resources 1110. A speaker 1136 and a microphone 1138 can be coupled to the CODEC 1134. FIG. 11 also indicates that a wireless controller 1140 can be coupled to the one or more processing resources 1110. The wireless controller 1140 may be further coupled to an antenna 1142 via a radio frequency (RF) interface 1180.

In a particular embodiment, the one or more processing resources 1110, the memory 906, the display controller 1126, the camera controller 1190, the CODEC 1134, and the wireless controller 1140, are included in a system-in-package or system-on-chip device 1122. An input device 1130 and a power supply 1144 may be coupled to the system-on-chip device 1122.

Moreover, in a particular embodiment, and as illustrated in FIG. 11, the display device 904, the input device 1130, the camera 1156, the speaker 1136, the microphone 1138, the antenna 1142, the RF interface 1180, and the power supply 1144 are external to the system-on-chip device 1122. However, each of the display device 904, the input device 1130, the camera 1156, the speaker 1136, the microphone 1138, the antenna 1142, the RF interface 1180, and the power supply 1144 can be coupled to a component of the system-on-chip device 1122, such as to an interface or to a controller.

In operation, user preference input 1192 may be received at the mobile device 902. The user preference input 1192 may adjust the user configuration parameters. The user preference input 1192 may be received at the display device 904 (e.g., at a touchscreen of the display device 904), at the input device 1130 (e.g., at a keyboard of the input device 1130), or a combination thereof. In the example of FIG. 11, the user preference input 1192 may reconfigure an order of image editing operations performed at the mobile device 902. The user preference input 1192 may reconfigure the user configuration parameters 916 to indicate that color change operations are to precede image blurring operations, as an illustrative example.

To further illustrate, the user preference input 1192 may reconfigure the user configuration parameters 916 from a first state to a second state. The first state may indicate that initial user input (e.g., the user input 918 of FIG. 9) is to initiate a color change operation and the subsequent user input (e.g., the user input 928 of FIG. 9) is to initiate an image blurring operation. By reconfiguring the user preference input 1192 from the first state to the second state, initial user input (e.g., the user input 918 of FIG. 9) may initiate an image blurring operation and that subsequent user input (e.g., the user input 928 of FIG. 9) may initiate a color change operation.

The techniques of FIG. 11 enable simplified control of a user interface (UI) by a user of a mobile device. For example, the UI may enable the user to set user configuration parameters that assign certain image editing operations to a particular user input (e.g., a swipe in a particular direction), which may simplify user control of an image editing application executed by the mobile device.

The instructions 1158 may be executable by the one or more processing resources 1110 to perform one or more operations described herein. To further illustrate, in connection with the described embodiments, a computer-readable medium (e.g., the memory 906) stores instructions (e.g., the instructions 1158) that are executable by a processor (e.g., the one or more processing resources 1110) to cause a mobile device (e.g., the mobile device 902) to display a first image (e.g., the image 908) at the mobile device and to receive first user input (e.g., the user input 918) at the mobile device. The first user input indicates a direction relative to the mobile device. The instructions are further executable by the processor to perform, based on the first user input, a first image editing operation on the first image to generate a second image (e.g., the image 924), to display the second image at the mobile device, and to receive second user input (e.g., the user input 928) at the mobile device. The second user input indicates the direction relative to the mobile device. The instructions are further executable by the processor to perform, based on the second user input, a second image editing operation on the second image to generate a third image (e.g., the image 934).

In connection with the described embodiments, an apparatus includes means for displaying (e.g., the display device 904) a first image (e.g., the image 908) at a mobile device (e.g., the mobile device 902) and means for receiving (e.g., the display device 904 and/or the input device 1130) first user input (e.g., the user input 918) at the mobile device. The first user input indicates a direction relative to the mobile device. The apparatus further includes means for performing a first image editing operation on the first image (e.g., the one or more processing resources 1110) to generate a second image (e.g., the image 924) based on the first user input, means for causing cause the mobile device to display the second image (e.g., the display device 904 and/or the input device 1130), and means for receiving (e.g., the display device 904 and/or the input device 1130) second user input (e.g., the user input 928). The second user input indicates the direction relative to the mobile device. The apparatus further includes means for performing a second image editing operation (e.g., the one or more processing resources 1110) on the second image to generate a third image (e.g., the image 934) based on the second user input.

Figure 12:
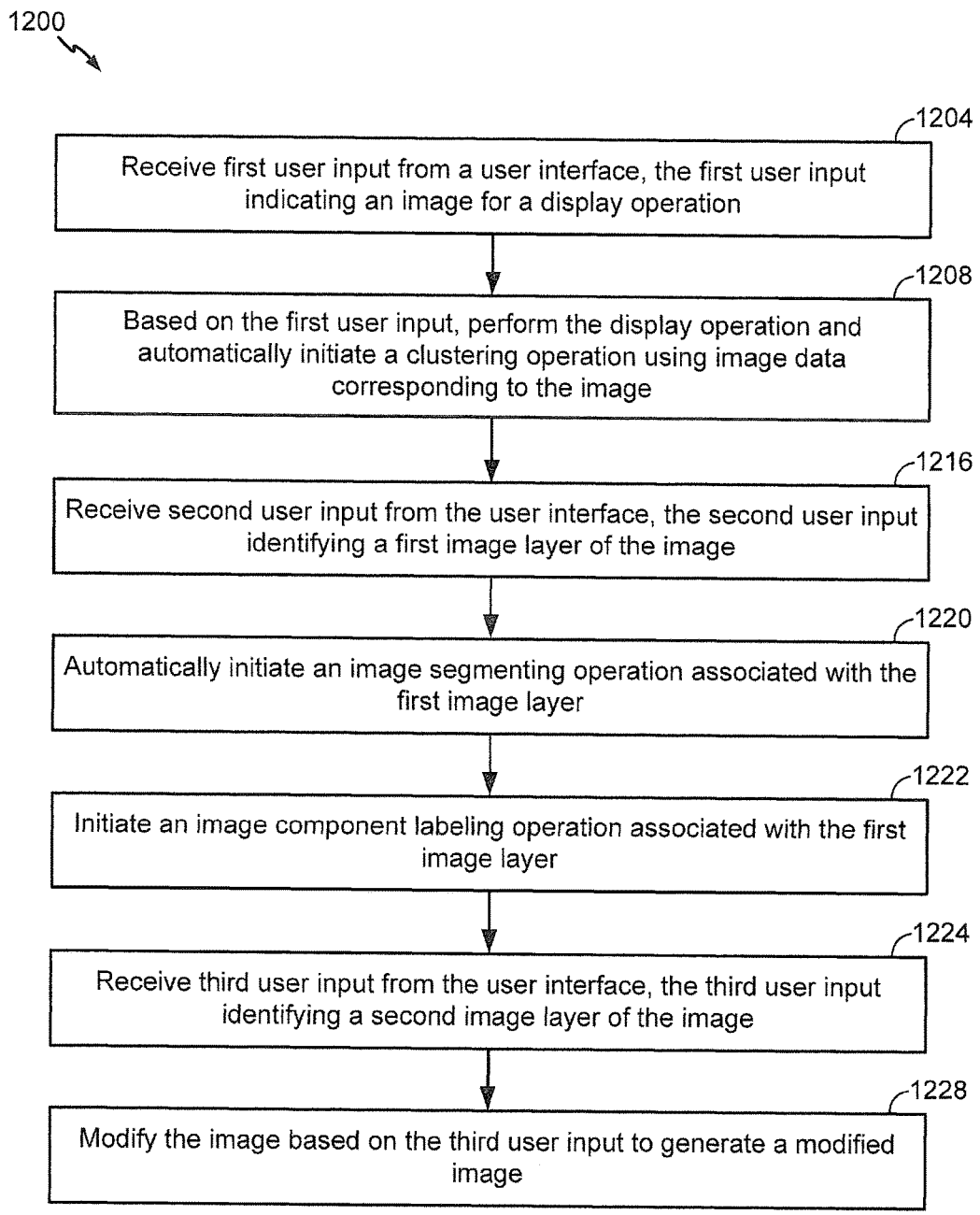
FIG. 12 is a flow diagram illustrating a method that may be performed by a device, such as a mobile device that includes the processor of FIG. 1.

Referring to FIG. 12, a particular embodiment of a method is depicted and generally designated 1200. The method 1200 may be performed by a processor, such as the processor 100 and/or any of the processing resources 810, 1110. The method 1200 may be performed at a device, such as a mobile device (e.g., one or more of the mobile devices 800, 902).

The method 1200 includes receiving first user input from a user interface, at 1204. The first user input may correspond to the user input 504, and the user interface may correspond to any of the UIs 500, 872, and 1172. The first user input indicates an image for a display operation. As an example, the image may correspond to the image 502. To further illustrate, the first user input may correspond to a touchscreen operation that selects the image from an image gallery that is presented at the user interface. The first user input may correspond to a request to enlarge the image at the user interface from a "thumbnail" view to a "full" view.

The method 1200 further includes performing the display operation and automatically initiating a clustering operation using image data corresponding to the image based on the first user input, at 1208. To illustrate, the clustering operation may be performed concurrently with the image being "loaded" at a mobile device. Loading the image may include enlarging the image (e.g., from a thumbnail view to a full view) or launching an image editing application, as illustrative examples. The clustering operation may include a SLIC operation. The clustering operation may be initiated to identify clusters within the image data while the display operation is performed to enlarge the image from a thumbnail view to a full view.

The method 1200 may further include receiving second user input from the user interface, at 1216. The second user input may correspond to the user input 918. The second user input identifies a first image layer of the image. The first image layer may correspond to the image layer 104*a*. The second user input may identify a foreground of the image using a swipe action at a touchscreen device. The second user input may indicate an image editing operation targeting the foreground (e.g., a color change operation, an image blur operation, etc.).

The method 1200 may further include automatically initiating an image segmenting operation associated with the first image layer, at 1220. For example, the image segmenting operation may be initiated automatically upon completion of the second user input (e.g., completion of a swipe action). In one or more other examples, the image segmenting operation may be initiated automatically upon receiving user input identifying a background of the image.

The method 1200 may further include performing an image component labeling operation, at 1222. The image component labeling operation may be initiated after completing the image segmenting operation.

The method 1200 may further include receiving third user input from the user interface, at 1224. The third user input identifies a second image layer of the image. For example, the third user input may identify a background of the image using a swipe action at a touchscreen device. The background may correspond to the second image layer. The third user input may correspond to the user input 928. The third user input may indicate an image editing operation targeting the background (e.g., a color change operation, an image blur operation, etc.).

The method 1200 may further include modifying the image based on the third user input to generate a modified image, at 1228. As a particular illustrative example, the modified image may include a foreground and a background that are modified based on the second user input and the third user input, respectively.

The method 1200 facilitates an enhanced image editing experience for a user. For example, by "hiding" a lag associated with an image clustering operation during loading of an image, an image editing operation may appear faster to a user (since for example clustering of the image may be completed prior to the user directly initiating the image editing operation through user input indicating an image editing operation to be performed on an image layer of the image). Further, the image segmenting operation may be initiated prior to receiving user input related to image processing operations of all image layers of the image. For example, the image segmenting operation may be initiated as soon as user input related to a first image layer (e.g., a foreground) is received and without (or prior to) user input related to a second image layer (e.g., a background) being received. In a particular example, image segmenting and component labeling operations are performed with respect to the first image layer while a user performs a swipe action to indicate an image editing operation associated with the second image layer, enhancing responsiveness and speed of image editing operations and improving a user experience.

In connection with the described embodiments, a computer-readable medium may store instructions that are executable by a processor to cause the processor to receive first user input from a user interface. The computer-readable medium may correspond to one or more of the memories 832, 906, and the processor may correspond to the processor 100 and/or any of the processing resources 810, 1110. The user interface may correspond to any of the UIs 500, 872, and 1172. The first user input selects an image for a display operation. The image may correspond to the image 502, and the first user input may correspond to the user input 504. The instructions are further executable by the processor to perform the display operation based on the first user input and to automatically initiate a clustering operation using image data corresponding to the image based on the first user input. The image data may correspond to the image data 102.

In connection with the described embodiments, an apparatus (e.g., any of the mobile devices 800, 902) includes means for receiving first user input from a user interface. The means for receiving the first user input may correspond to the display 828 and/or the display device 904. The user interface may correspond to any of the UIs 500, 872, and 1172. The first user input selects an image for a display operation. The image may correspond to the image 502, as an illustrative example. The apparatus further includes means for performing the display operation based on the first user input (e.g., the display 828 and/or the display device 904) and means for automatically initiating a clustering operation (e.g., the processor 100 and/or any of the processing resources 810, 1110) using image data (e.g., the image data 102) corresponding to the image based on the first user input.

Those of skill in the art will appreciate that the foregoing disclosed devices and functionalities may be designed and configured into computer files (e.g., RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed within devices, such as within the mobile device 800 and/or the mobile device 902.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory medium is coupled to the processor such that the processor can read information from, and write information to, the storage medium. In the alternative, the storage medium may be integral to the processor. The processor and the storage medium may reside in an application-specific integrated circuit (ASIC) and/or a field programmable gate array (FPGA) chip. The ASIC and/or FPGA chip may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of manipulating an image by a mobile device, the method comprising:
   segmenting image data corresponding to the image into a first image layer and a second image layer;
   receiving first user input at the mobile device, the first user input indicating a direction relative to the mobile device;
   performing a first image editing operation on the first image layer based on the first user input;
   receiving second user input at the mobile device, the second user input indicating the direction relative to the mobile device; and
   performing a second image editing operation on the first image layer based on the second user input, the second image editing operation distinct from the first image editing operation.

2. The method of claim 1, further comprising:
   before segmenting the image data, receiving third user input at the mobile device, the third user input selecting the image for a display operation; and
   based on the third user input:
      performing the display operation; and
      automatically initiating a clustering operation using the image data, wherein the segmenting of the image is performed based on the clustering operation.

3. The method of claim 2, wherein the third user input corresponds to a touchscreen operation that selects the image from an image gallery that is presented at a user interface of the mobile device.

4. The method of claim 2, wherein the clustering operation is initiated to identify clusters within the image data while the display operation is performed to enlarge the image from a thumbnail view to a full view.

5. The method of claim 4, wherein the clustering operation uses a simple linear iterative clustering (SLIC) technique to identify the clusters.

6. The method of claim 1, further comprising:
generating a second image based on the first image editing operation;
displaying the second image;
generating a third image based on the second image editing operation; and
displaying the third image.

7. The method of claim 1, further comprising: receiving third user input at the mobile device, the third user input indicating a second direction relative to the mobile device, wherein the second direction is distinct from the direction;
performing a third image editing operation based on the third user input;
receiving fourth user input at the mobile device, the fourth user input indicating the second direction; and
performing a fourth image editing operation based on the fourth user input, the fourth image editing operation distinct from the third image editing operation.

8. The method of claim 7, wherein the third image editing operation and the fourth image editing operation are performed on the second image layer independently of the first image layer.

9. The method of claim 7, wherein the first image editing operation and the second image editing operation are included in a first sequence of image editing operations, wherein the third image editing operation and the fourth image editing operation are included in a second sequence of image editing operations different than the first sequence, and further comprising:
performing a next image editing operation in the first sequence in response to fifth user input indicating the direction; and
performing a next image editing operation in the second sequence in response to sixth user input indicating the second direction.

10. The method of claim 1, wherein the first image editing operation and the second image editing operation are performed on the first image layer independently of the second image layer.

11. The method of claim 10, wherein the first user input and the second user input are received via a user interface (UI) of the mobile device.

12. An apparatus comprising:
a memory; and
a processor coupled to the memory, wherein the processor is configured to:
segment image data corresponding to an image into a first image layer and a second image layer,
receive first user input indicating a direction relative to a mobile device;
perform a first image editing operation on the first image layer based on the first user input;
receive second user input indicating the direction relative to the mobile device; and
perform a second image editing operation on the first image layer based on the second user input, the second image editing operation distinct from the first image editing operation.

13. The apparatus of claim 12, wherein one of the first image layer and the second image layer corresponds to a first portion of a foreground of the image, and wherein the other of the first image layer and the second image layer corresponds to a second portion of the foreground of the image.

14. The apparatus of claim 12, wherein one of the first image layer and the second image layer corresponds to a first portion of a background of the image, and wherein the other of the first image layer and the second image layer corresponds to a second portion of the background of the image.

15. The apparatus of claim 12, wherein the processor is further configured to identify a cluster associated with the image data and to segment the image data based on the cluster.

16. The apparatus of claim 12, wherein the processor is further configured to perform one or more component labeling operations using the first image layer.

17. The apparatus of claim 12, further comprising a display device, wherein the processor is further configured to cause a user interface (UI) to be displayed at the display device, and wherein the first user input and the second user input are received via the display device.

18. A non-transitory computer-readable medium storing instructions that are executable by a processor to cause the processor to:
segment image data associated with an image into a first image layer and a second image layer,
receive first user input at a mobile device, the first user input indicating a direction relative to the mobile device;
perform a first image editing operation on the first image layer based on the first user input;
receive second user input at the mobile device, the second user input indicating the direction relative to the mobile device; and
perform a second image editing operation on the first image layer based on the second user input, the second image editing operation distinct from the first image editing operation.

19. The non-transitory computer-readable medium of claim 18, wherein one of the first image layer and the second image layer corresponds to a foreground of the image, and wherein the other of the first image layer and the second image layer corresponds to a background of the image.

20. The non-transitory computer-readable medium of claim 18, wherein the first user input corresponds to a first swipe operation at a display device of the mobile device and the second user input corresponds to a second swipe operation at the display device.

21. The non-transitory computer-readable medium of claim 18, wherein the first image editing operation includes an image blurring operation, and wherein the second image editing operation includes a color change operation.

22. The non-transitory computer-readable medium of claim 18, wherein the instructions are further executable by the processor to identify a cluster associated with the image data and to segment the image data based on the cluster.

23. The non-transitory computer-readable medium of claim 18, wherein an order of the first image editing operation and the second image editing operation is based on user configuration parameters stored at the mobile device.

24. The non-transitory computer-readable medium of claim 18, wherein the instructions are further executable by the processor to receive the first user input and the second user input via a user interface (UI).

25. An apparatus comprising:
means for segmenting image data associated with an image into a first image layer and a second image layer,
means for receiving first user input, the first user input indicating a direction relative to a mobile device;
means for performing a first image editing operation on the first image layer based on the first user input;

means for receiving second user input, the second user input indicating the direction relative to the mobile device; and means for performing a second image editing operation on the first image layer based on the second user input, the second image editing operation distinct from the first image editing operation.

26. The apparatus of claim 25, wherein one of the first image layer and the second image layer corresponds to a foreground of the image, and wherein the other of the first image layer and the second image layer corresponds to a background of the image.

27. The apparatus of claim 25, further comprising means for generating the image data.

28. The apparatus of claim 12, further comprising an imaging device coupled to the processor and configured to generate the image data, wherein the processor is further configured to receive the image data generated by the imaging device.

29. The apparatus of claim 25, further comprising means for identifying a cluster associated with the image data, wherein the image data is segmented based on the cluster.

30. The apparatus of claim 25, further comprising means for performing one or more component labeling operations using the first image layer.

\* \* \* \* \*